(12) United States Patent
Miller

(10) Patent No.: US 11,654,768 B2
(45) Date of Patent: May 23, 2023

(54) REPOWERING SYSTEM FOR VEHICLES AND VESSELS

(71) Applicant: AdvanTec Global Innovations Inc., Chilliwack (CA)

(72) Inventor: Brad Miller, Chilliwack (CA)

(73) Assignee: Advantec Global Innovations, Inc

( * ) Notice: Subject to any disclaimer, the term of this patent is extended or adjusted under 35 U.S.C. 154(b) by 86 days.

(21) Appl. No.: 17/203,514

(22) Filed: Mar. 16, 2021

(65) Prior Publication Data

US 2021/0291642 A1    Sep. 23, 2021

(30) Foreign Application Priority Data

Mar. 19, 2020   (CA) .............................. CA 3076403

(51) Int. Cl.
*B60K 15/07*   (2006.01)
*B60K 15/03*   (2006.01)

(52) U.S. Cl.
CPC ............. *B60K 15/03006* (2013.01); *B60K 2015/03019* (2013.01)

(58) Field of Classification Search
CPC ...... B66F 9/22; B66F 9/18; B66F 9/12; B66F 17/003; B66F 9/06; B66F 9/07563;
(Continued)

(56) References Cited

U.S. PATENT DOCUMENTS 6,502,696 B2 *  1/2003  Heinrichs ............. B65D 19/44
                                                      108/55.3
7,270,209 B2     9/2007  Suess
(Continued)

FOREIGN PATENT DOCUMENTS

CA   2386443        11/2002
FR   3061261         6/2018
FR   3061261 A1 *    6/2018   ............... F17C 5/06

OTHER PUBLICATIONS

Screenshot of https://www.mineenergysolutions.com/refuelling-options/, accessed Feb. 28, 2020, Mine Energy Solutions, (2 pages).

*Primary Examiner* — George C Jin
*Assistant Examiner* — Teuta B Holbrook
(74) *Attorney, Agent, or Firm* — Marc Baumgartner; Baumgartner Patent Law

(57) ABSTRACT

A system for retaining a plurality of compressed gas cannisters for fueling a vehicle is provided, the system comprising:
 a base which includes: a plate including a distal end and a proximal end; a base engagement member at the distal end of the plate; and a first mating member proximate the proximal end;
 a cassette which includes: a top; a first side; a second side; a front; a back; a bottom to define an interior, the interior for housing the plurality of compressed gas cannisters; at least one fork pocket mounted on one of the top, the bottom or the back, the fork pocket extending from a distal end a distance; a plurality of gas cannister apertures extending between the interior and an ambient environment, wherein the bottom includes a bottom engagement member which extends outward beyond the first side at the distal end; a locking mechanism proximate the distal end; and a second mating member proximate a proximal end, wherein the first mating member and the second mating member are in pivotal engagement in use.

6 Claims, 23 Drawing Sheets

(58) Field of Classification Search
CPC .............. B60K 15/03; B60K 15/03006; B60K 2015/03019; B60K 2015/03131; B60K 2015/03144; B60K 2015/03164; B60K 2015/03184
See application file for complete search history.

(56) References Cited

U.S. PATENT DOCUMENTS

| | | | |
|---|---|---|---|
| 10,195,937 B2 | 2/2019 | Sloan et al. | |
| 2010/0012550 A1* | 1/2010 | Dedmon | B65D 77/061 |
| | | | 383/105 |
| 2013/0180437 A1* | 7/2013 | Wilcox | B65D 19/0012 |
| | | | 29/426.6 |
| 2014/0023476 A1* | 1/2014 | Neuwirth | B65G 1/026 |
| | | | 108/51.11 |
| 2014/0138173 A1* | 5/2014 | Gibb | B60K 15/077 |
| | | | 180/69.5 |
| 2016/0023548 A1* | 1/2016 | Crist | B60K 15/03006 |
| | | | 180/271 |
| 2017/0282710 A1* | 10/2017 | Sloan | F17C 13/084 |
| 2017/0291734 A1* | 10/2017 | Allegretti | B65D 88/54 |
| 2017/0313179 A1 | 11/2017 | Sloan et al. | |
| 2018/0111477 A1 | 4/2018 | Sloan et al. | |
| 2018/0257580 A1* | 9/2018 | Sloan | B60K 15/03006 |
| 2019/0084415 A1 | 3/2019 | Sloan et al. | |
| 2019/0300235 A1* | 10/2019 | Jefferson | B60B 33/0086 |
| 2019/0301682 A1 | 10/2019 | Sloan et al. | |

* cited by examiner

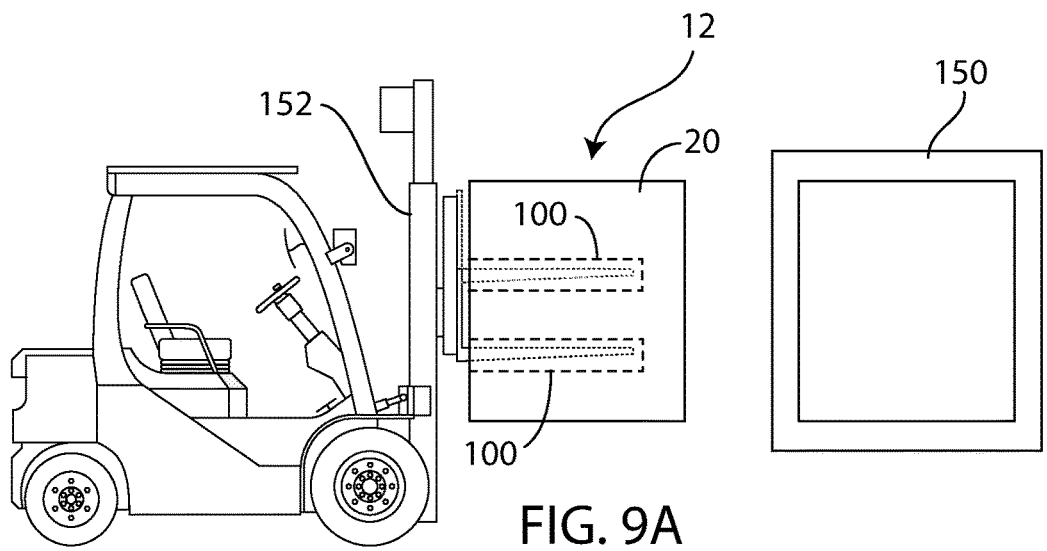
FIG. 9A
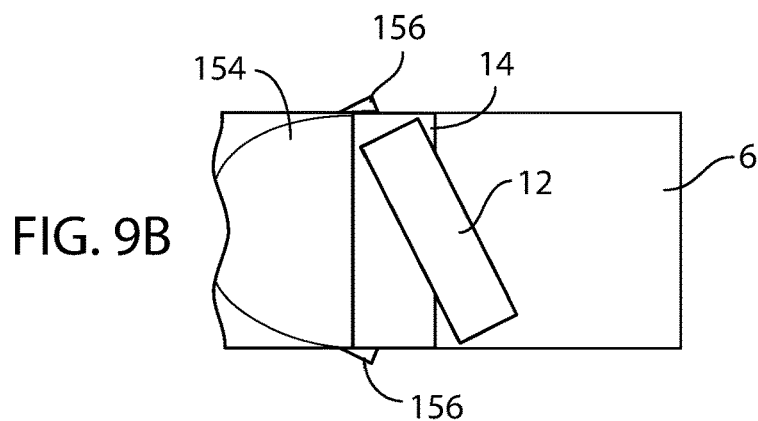
FIG. 9B
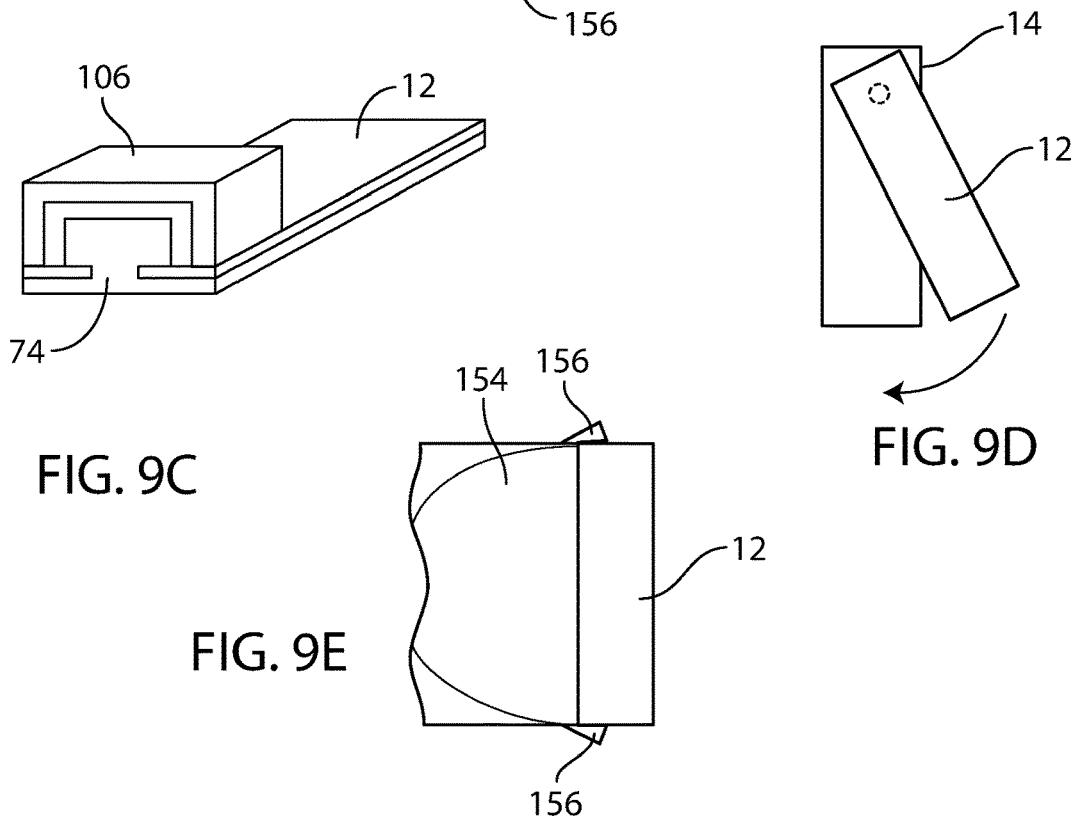
FIG. 9C
FIG. 9D
FIG. 9E

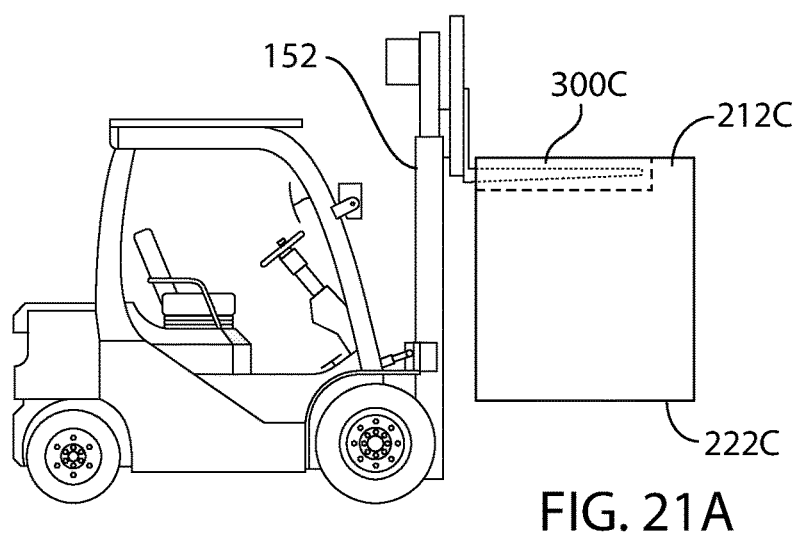
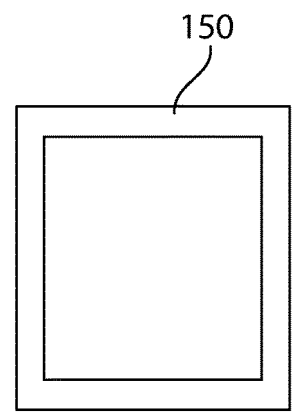
FIG. 21A
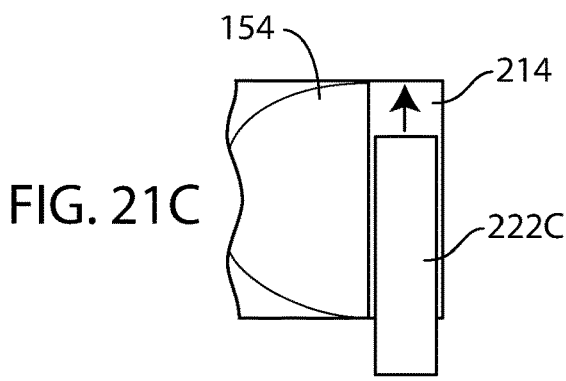
FIG. 21B  FIG. 21C
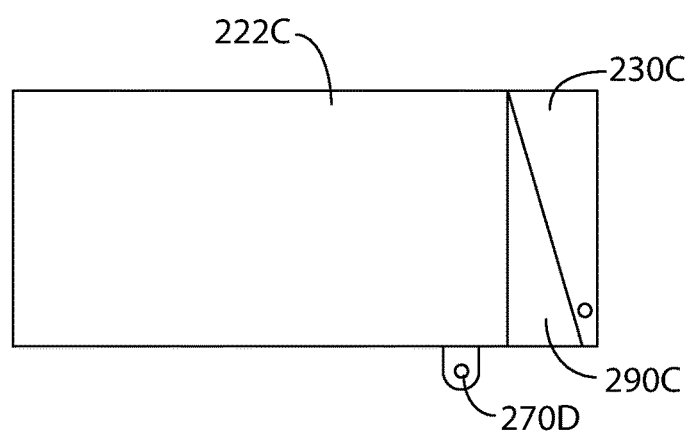
FIG. 21D
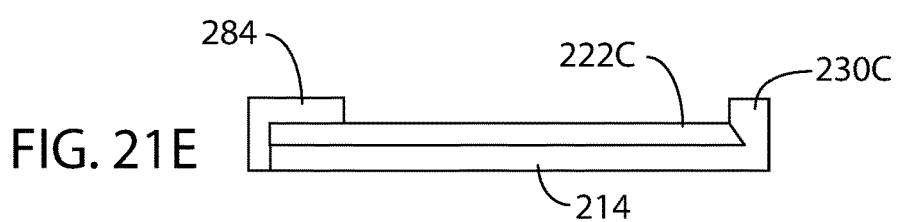
FIG. 21E

REPOWERING SYSTEM FOR VEHICLES AND VESSELS

CROSS REFERENCE TO RELATED APPLICATIONS

This application claims benefit of Canadian Patent Application Serial No. 3,076,403, filed Mar. 19, 2020, entitled REPOWERING SYSTEM FOR VEHICLES AND VESSELS, the contents of which are incorporated herein by reference.

FIELD

The present technology is directed to a rapid refueling system for vehicles powered with compressed gas. More specifically, it is a cassette that is configured to be releasably mounted on the vehicle and which houses hydrogen fuel cannisters.

BACKGROUND

Compressed gas fueled vehicles have cannisters of compressed gas housed either directly in the vehicle or in a housing in the vehicle. When the cannisters need to be refueled, the vehicle is taken to a refueling station where the cannisters are refilled. The vehicle may be hydrogen fuel cell powered, mixed hydrogen and diesel fueled, natural gas fueled, liquid natural gas fueled, propane fueled and the like. In the case of hydrogen fuel cell powered vehicles, a refueling station can fill a 4 kilogram cannister in three to five minutes. A 4-kilogram hydrogen tank (8.8 pounds) holds the energy equivalent of 16 liters of gasoline, hence a transport truck would require multiple cannisters. Refueling times for six cannisters is 18 to 30 minutes. Thus for hydrogen fuel cell powered transport trucks, a more rapid refueling system is needed.

Canadian Patent Application No. 2386443 discloses a unitary fuel module comprising one or more fuel cylinders mounted to a frame as a module, preferably through neck-mounts and having fueling lines for connecting to the fuel cylinders to the vehicle. The module can be removed to allow for it to be serviced. There is no teaching of using it as a refueling module.

https://www.mineenergysolutions.com/ discloses a swap and go system, wherein an empty fuel container is removed from a cabinet in the vehicle and is replaced with a full fuel container. The system requires complex robotics at a static refueling station.

FR3061261 discloses a removable device for supplying compressed gas to a vehicle using gas as fuel comprises: —at least one reservoir of compressed gas provided with an outlet valve connected to a gas pressure regulator, —the gas pressure regulator, configured to expand the gas to a predetermined pressure, —a pipe for connection of the expanded gas, configured to be inserted in an auxiliary supply inlet gas from the vehicle and—a removable fixing, configured to be fixed to the vehicle. There is no teaching of using the removable device to refuel the vehicle.

In a related art, modular fuel storage systems are provided. For example, United States Patent Application 20190301682, U.S. Pat. Nos. 10,274,134 and 9,388,942 disclose methods and systems for modular fuel storage and transportation. In an embodiment, a fuel storage system includes one or more fuel containers each supported by a fuel container support assembly. The fuel storage system may be mounted to a transportation device such as a vehicle or used in a stand-alone fashion. Each support assembly may include a plurality of detachable end support members such as end support members configured to support the end portions of the fuel container and side support members configured to support the body portion of the fuel container. Some of the end support members may include neck grooves such that when the end support members are coupled, the neck grooves form an enclosure around the neck portion of the fuel container. In an embodiment, the support assembly is configured to facilitate release of excess pressure in the fuel container. The sides may be a single-piece surface structure. An enclosure located behind the cab of a truck is shown. The fuel containers are refueled in situ, which as noted above, is a slow process.

The system can be seen at: https://agilityfuelsolutions.com/procab-cng-fuel-systems/

United States Patent Application 20180257580 discloses methods and systems for fuel storage and transportation. A support assembly for supporting a plurality of fuel containers may comprise a plurality of end support members, and a plurality of side support members that are detachably coupled to the plurality of end support members. The plurality of fuel containers may be configured to be located on a plurality of different planes when supported by the support assembly, in a manner that permits the support assembly to accommodate a plurality of tailgates of different shapes and/or dimensions. The fuel containers are retained with neck brackets. There may be a cover for the support assembly and fuel containers. The fuel containers are refueled in situ, which as noted above, is a slow process.

United States Patent Application 20180111477 discloses an assembly bracket system. The system includes a first bracket portion and a second bracket portion. The first bracket portion is configured to be attached to a vehicle tailgate. The second bracket portion is configured to be attached to a vehicle fuel system. The first bracket portion and the second bracket portion are configured to be engaged to each other in a manner that limits at least one degree of freedom of the vehicle fuel system relative to the vehicle tailgate while allowing pivoting of the second bracket portion relative to the first bracket portion. The fuel containers are refueled in situ, which as noted above, is a slow process.

United States Patent Application 20190084415 discloses systems and methods for mounting a fuel system to a vehicle. In some embodiments, the invention provides systems and methods for mounting a fuel system comprising a fuel tank to a vehicle chassis using a bracket, which may be a multi-part bracket, and may be referred to as a "drop and go" bracket. The fuel system and bracket may be partially or completely covered with a cover. The fuel containers are refueled in situ, which as noted above, is a slow process.

United States Patent Application 20170313179 discloses a fuel system for a vehicle. The fuel system is configured to couple to a frame rail of the vehicle. A fuel system frame assembly of the fuel system is configured to couple with the frame rail directly or with another component that is coupled, directly or indirectly, with the frame rail. A cowling of the fuel system can include a fuel pressure vessel. The fuel pressure vessel configured to be placed within and supported by the fuel system frame assembly. The fuel system is configured to enhance component arrangement efficiency when mounted to a vehicle frame rail. The fuel system is permanently attached to the vehicle and refueling is accomplished by accessing the fuel containers through an access panel. As the fuel containers are refueled in situ, this is a slow process.

U.S. Pat. No. 10,195,937 discloses methods and systems for modular fuel storage and transportation. In an embodiment, a fuel storage system includes one or more fuel containers each supported by a fuel container support assembly. The fuel storage system may be mounted to a transportation device such as a vehicle or used in a stand-alone fashion. Each support assembly comprises a first end support member and a second end support member; a first side support member coupled to the first end support member and a second side support member coupled to the second end support member; a supporting crossbar and a removable crossbar each coupling the first and second end support members together, wherein the removable crossbar is removably coupled to one or more of the first or second end support members and removably attachable to the first and second side support members to couple the first and second end support members to one another, wherein the first and second end support members are arranged to enclose a length of the fuel container therebetween, and the first and second side support members are configured to support the fuel container when placed lengthwise therebetween, wherein the supporting crossbar and the removable crossbar are arranged to enclose a width of the fuel container therebetween, and wherein the first side support member comprises an aperture such that when the fuel container is placed within the fuel container support assembly, a neck portion of the fuel container is supported within the aperture. The fuel containers are refueled in situ, which as noted above, is a slow process.

U.S. Pat. No. 7,270,209 discloses a gaseous fuel storage system for a vehicle. The fuel storage system can be installed as a modular unit in the vehicle. The fuel storage system is pivotable relative to the vehicle to allow easy accessibility to the storage tanks without requiring the storage tanks to be unmounted from the vehicle. The fuel storage system also provides protection for the storage tanks through the use of shielding and energy absorbing material. While the storage tanks can be accessed, there is no disclosure as to how the storage tank or vehicle is refueled.

What is needed is a system that allows for rapid refueling of compressed gas powered vehicles. It would be preferable if the system included a cassette that is releasably retained on the vehicle and that the cassette retained a plurality of fuel containers. It would be further preferable if the cassette could be removed and replaced with a forklift. It would be further preferable if the cassette could be loaded onto a vehicle that has fairings and fit snugly against the cab.

SUMMARY

The present technology is a system that allows for rapid refueling of compressed-gas powered vehicles. The system includes a cassette that is releasably retained on the vehicle. The cassette retains one or more fuel containers. The cassette can be both removed and replaced with forklift. Further, the cassette can be pivoted with the lift mechanism, allowing for it to be snugly mounted against the back of a cab of a tractor-trailer, even if the cab has a fairing.

In one embodiment, a system for retaining a plurality of compressed gas cannisters for fueling a vehicle is provided, the system comprising:

a base which includes: a plate including a distal end and a proximal end; a base engagement member at the distal end of the plate; and a first mating member proximate the proximal end;

a cassette which includes: a top; a first side; a second side; a front; a back; a bottom to define an interior, the interior for housing the plurality of compressed gas cannisters; at least one fork pocket mounted on one of the top, the bottom or the back, the fork pocket extending from a distal end a distance; a plurality of gas cannister apertures extending between the interior and an ambient environment, wherein the bottom includes a bottom engagement member which extends outward beyond the first side at the distal end; a locking mechanism proximate the distal end; and a second mating member proximate a proximal end, wherein the first mating member and the second mating member are in pivotal engagement in use.

In the system, the first mating member is a pivot mount with at least one stop and the second mating member is configured to pivot about the pivot mount until it reaches the at least one stop.

The system may comprise two fork pockets on the back.

In the system, the base may include a base aperture and the bottom includes at least one bottom aperture.

In the system, the locking mechanism may be a pin coupled to a handle, the pin engaged with the bottom aperture and for engagement with the base aperture.

In the system, the base engagement member may be a wedge with a side defining an obtuse angle along its length and the bottom engagement member may be a wedge with a side defining an acute angle along its length.

The system may further comprise the plurality of compressed gas cylinders.

In the system, the compressed gas cylinders may contain hydrogen gas.

In another embodiment, a system for retaining a plurality of compressed gas cannisters for fueling a vehicle is provided, the system comprising:

a base which includes: a plate; and a locking wedge at a distal end of the plate, the locking wedge defining an obtuse angle;

a cassette which includes: a top; a first side; a second side; a front; a back; a bottom to define an interior, the interior for housing the plurality of compressed gas cannisters; at least one fork pocket mounted on one of the top, the bottom or the back, the fork pocket extending from a distal end a distance; a plurality of gas cannister apertures extending between the interior and an ambient environment; and a locking mechanism proximate the distal end; wherein the bottom includes a lip which extends outward beyond the first side at the distal end; and a pivot mount. proximate a proximal end of the base and a proximal end of the cassette, and which includes a first mating member on the base and a second mating member on the bottom, the first mating member and the second mating member releasably engaged.

In another embodiment, a system for retaining a plurality of compressed gas cannisters for fueling a vehicle is provided, the system comprising:

a base which includes: a pivot mount proximate a proximal end; a locking wedge at a distal end; and a locking mechanism proximate the distal end; and a cassette which includes: a top; a first side; a second side; a front; a back; a bottom to define an interior, the interior for housing the plurality of compressed gas cannisters; at least one fork pocket mounted on one of the top, the bottom or the back, the fork pocket extending from the first side a distance; a plurality of gas cannister apertures extending between the interior and an ambient environment, wherein the bottom includes a lip which extends outward beyond the first side and a mounting member proximate a proximal end of the bottom, the mounting member for releasably engaging the pivot mount.

In another embodiment, a system for fueling a compressed gas fueled vehicle is provided, the system comprising:

a base which includes: a plate; a locking wedge at a distal end of the plate, the locking wedge defining an obtuse angle; a locking mechanism proximate the distal end; and vehicle frame mounts;

a plurality of compressed gas cannisters;

a cassette which includes: a top; a first side; a second side; a front; a back; a bottom to define an interior, the interior housing the plurality of compressed gas cannisters; at least one fork pocket mounted on one of the top, the bottom or the back, the fork pocket extending from the first side a distance; a plurality of gas cannister apertures extending between the interior and an ambient environment, wherein the bottom includes a lip which extends outward beyond the first side; and a pivot mount, proximate a proximal end, and which includes a first mating member on the base and a second mating member on the bottom.

In yet another embodiment, a lift mechanism attachment for use with a suitable machine is provided, the lift mechanism comprising; a base which includes brackets for releasably engaging an article to be lifted; two rails attached to an underside of the base; pivot mounts in slidable engagement with the two rails; two forks attached to the pivot mounts and extending outward from the underside; and at least one actuator attached to the underside of the base and the two forks.

The lift mechanism attachment may further comprise a beam between the two forks and the pivot mounts, the actuator attached to the beam In the lift mechanism attachment, the two forks may each include a tab for engaging fork mount apertures of the article to be lifted.

In yet another embodiment, a method of loading a cassette is provided, which includes a bottom engagement member and a mounting member, onto a truck, the method comprising: selecting a base which includes a pivot mount and a base engagement member; lifting the cassette; aligning the cassette such that the mounting member engages the pivot mount; pivoting the cassette on the base until the bottom engagement member and the base engagement member engage; and locking the cassette to the base.

FIGURES

Figure 6:
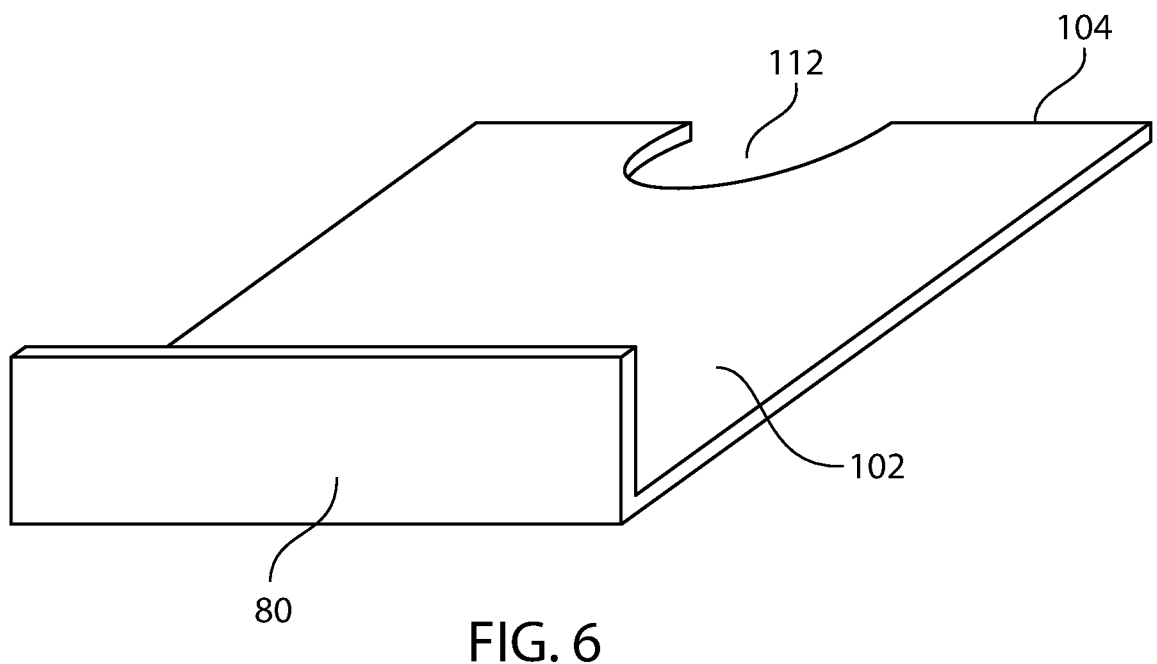
FIG. 6 is a top view of an alternative embodiment of the bottom of the cassette of FIG. 5.
Figure 7A:
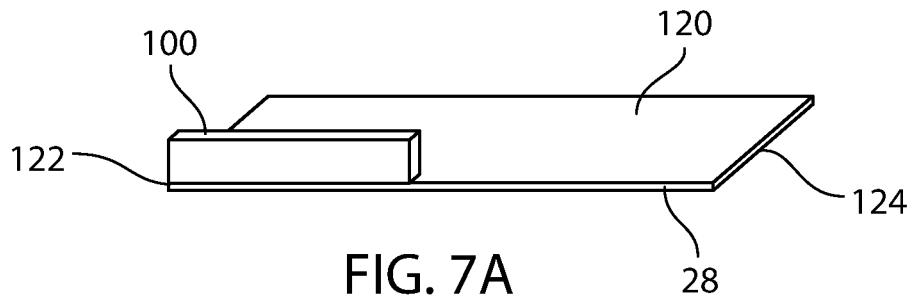
Figure 7B:
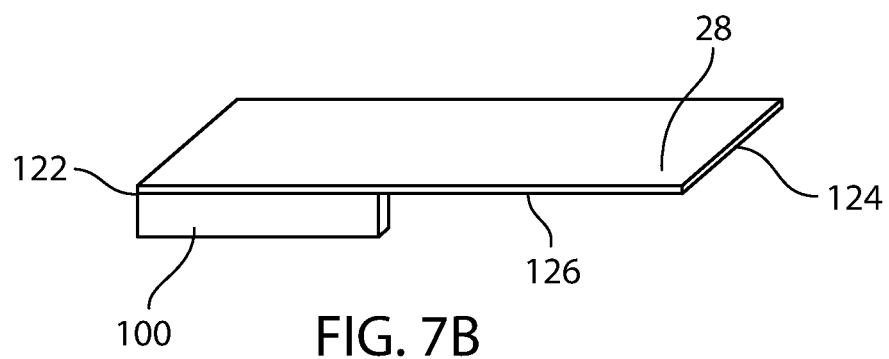
Figure 7C:
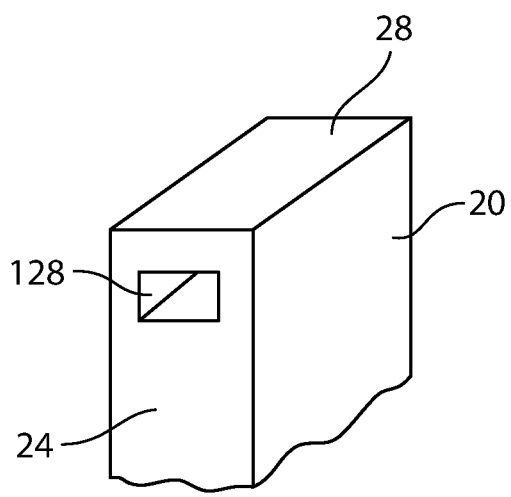
Figure 7D:
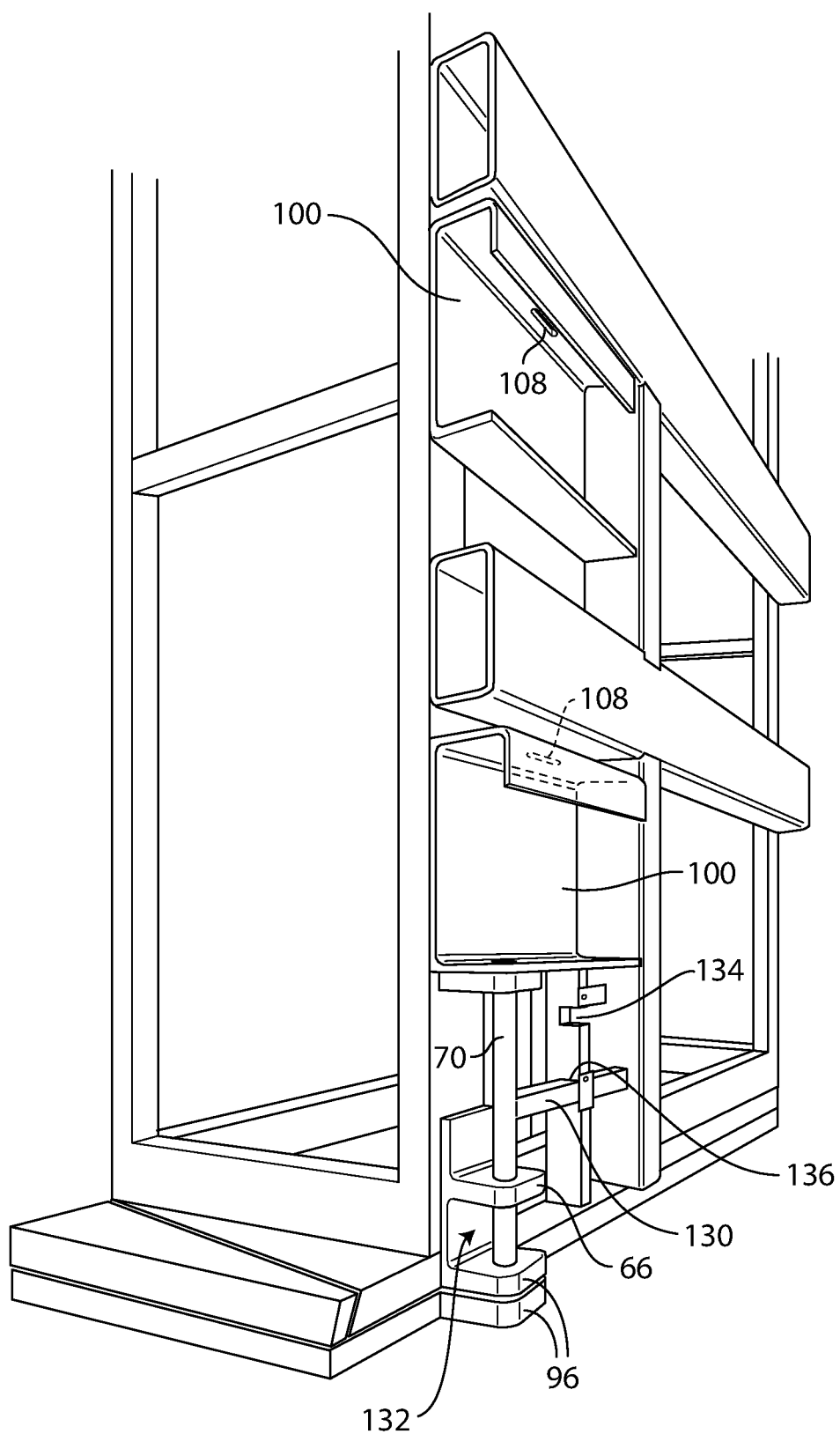

FIG. 7A is a perspective view of the top of the cassette in an alternative embodiment in conjunction with the embodiment of FIG. 6; FIG. 7B is a perspective view of the top of the cassette in an alternative embodiment in conjunction with the embodiment of FIG. 6; FIG. 7C is a perspective view of FIG. 7B; and FIG. 7D is a back view of the back of the cassette in an alternative embodiment in conjunction with the embodiment of FIG. 6.

Figure 2:
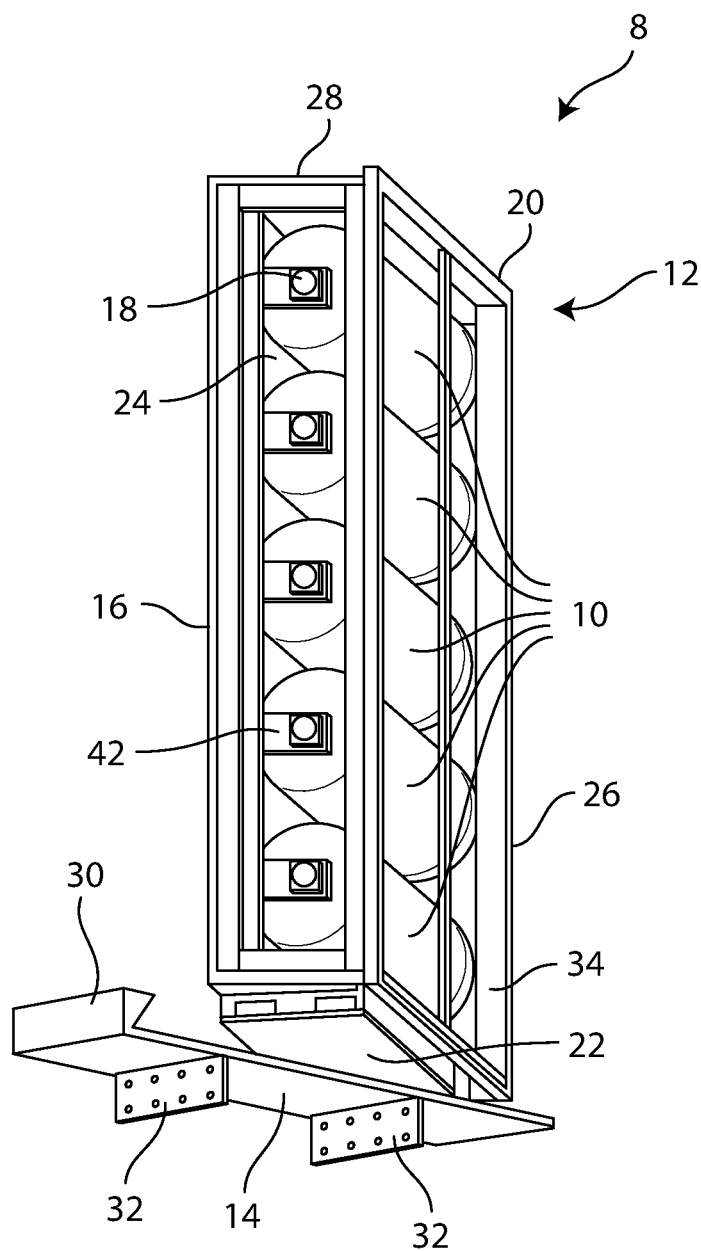
FIG. 2 is a perspective view of the refueling system of the present technology.
Figure 8:
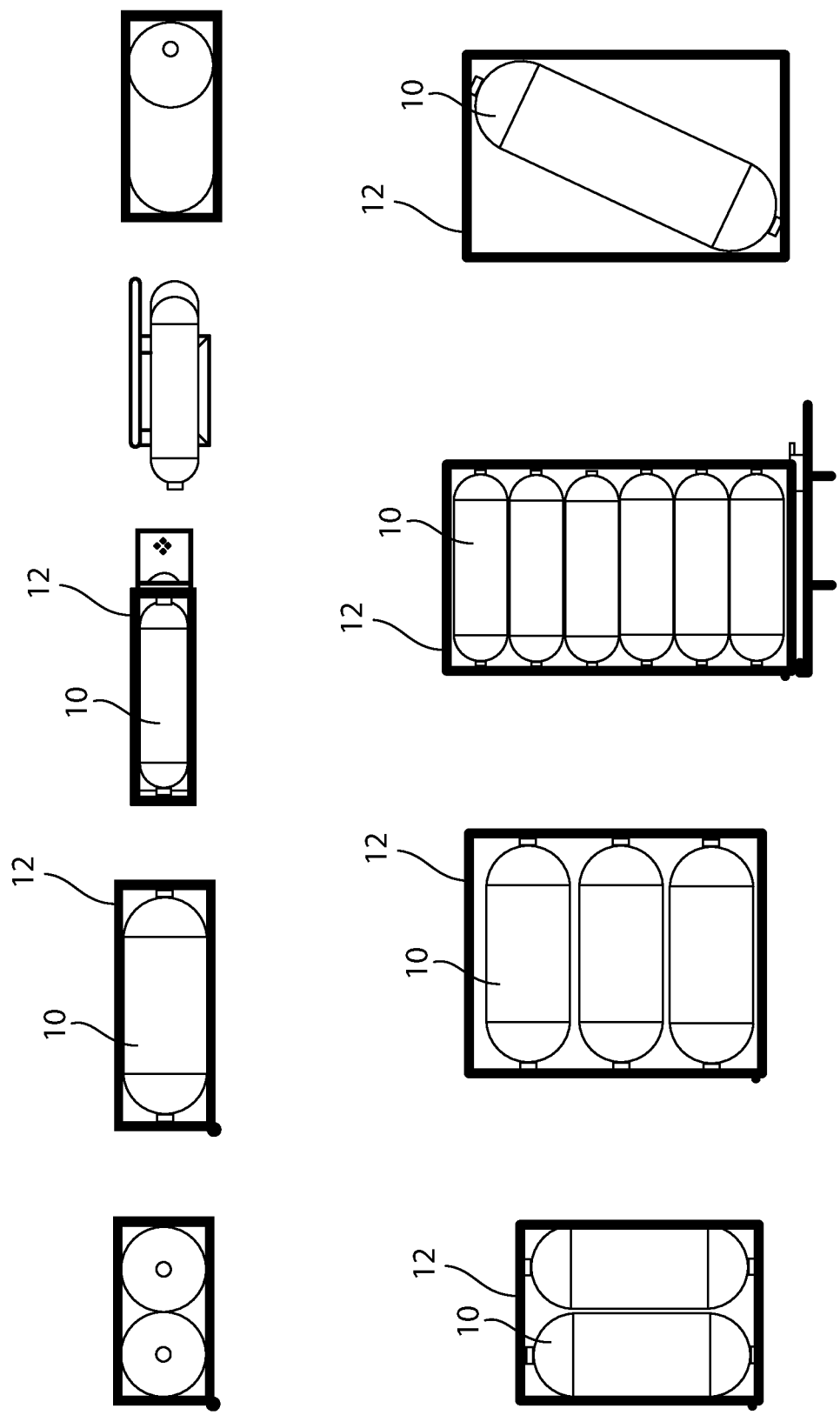

FIG. 8 shows various configurations of fuel cannisters in the cassette in the refueling system of FIG. 2.

FIG. 9A through 9E show the steps of loading a cassette onto a tractor. FIG. 9A shows a sectional view of the cassette and FIGS. 9B to 9E show the base and the bottom as they are positioned, moved and locked.

Figure 10A:
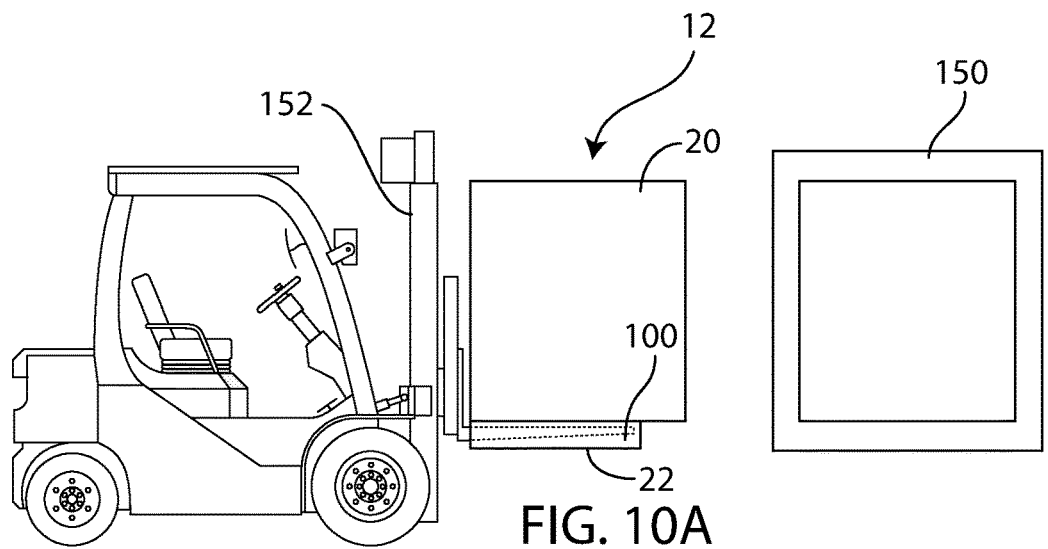

FIG. 10A through 10E show the steps of loading and unloading an alternative embodiment cassette onto a tractor. FIG. 10A shows a sectional view of the cassette and FIGS. 10B to 10E show the base and the bottom they are positioned, moved and locked.

Figure 11A:
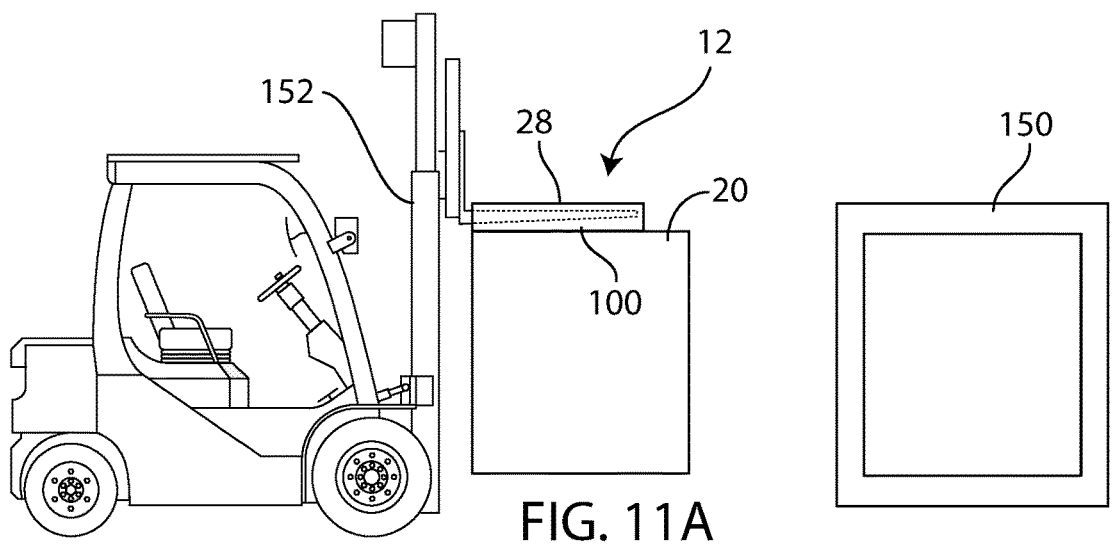

FIG. 11A through 11E show the steps of loading an alternative embodiment cassette onto a tractor. FIG. 11A shows a sectional view of the cassette and FIGS. 11B to 11E show the base and the bottom they are positioned, moved and locked.

Figure 12:
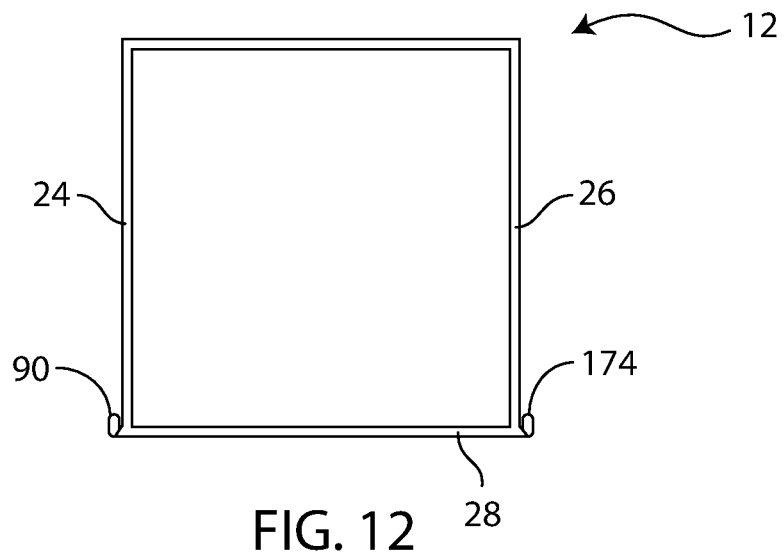

FIG. 12 is a top view of an alternative embodiment of the refueling system with fairings.

Figure 13A:
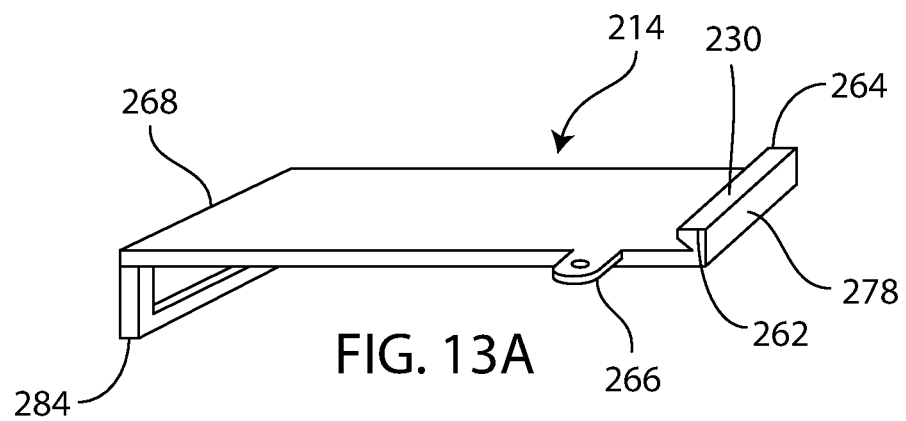
Figure 13B:
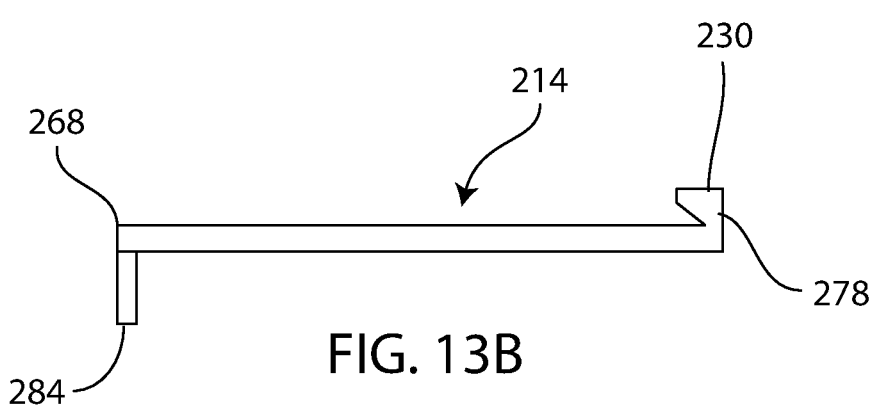

FIG. 13A is a perspective view of an alternative embodiment base; and FIG. 13B is a side view of the alternative embodiment base.

Figure 14A:
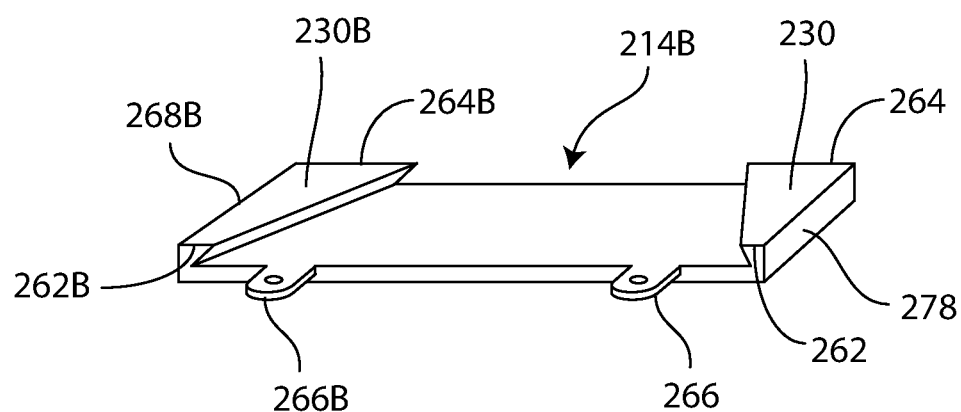
Figure 14B:
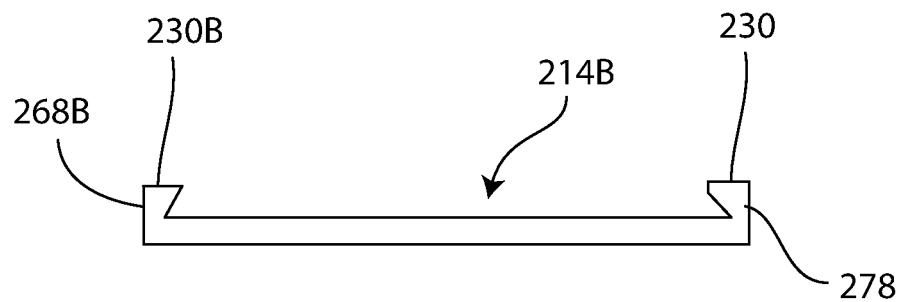

FIG. 14A is a perspective view of an alternative embodiment base and FIG. 14B is a side view.

Figure 15A:
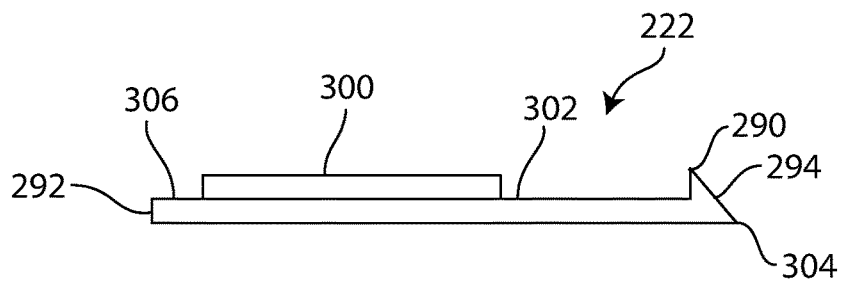
Figure 15B:
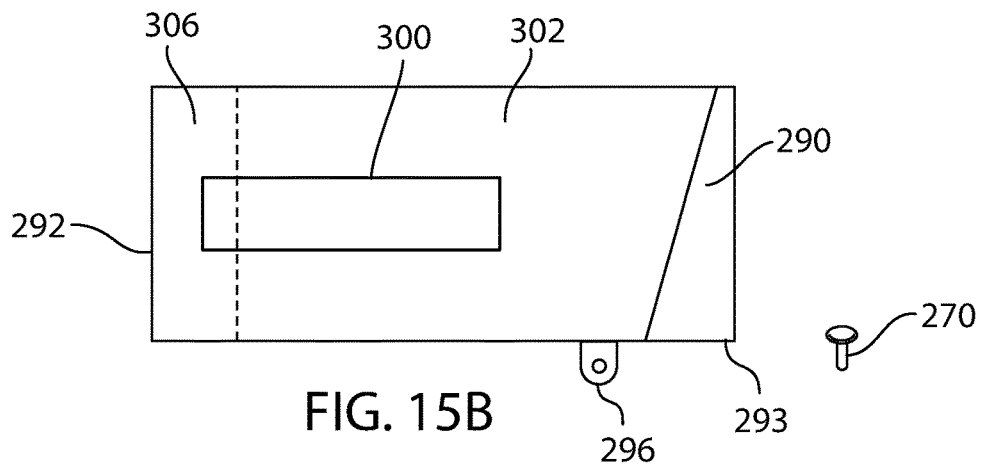

FIG. 15A is a side view of an alternative embodiment bottom of the cassette for use with the base of FIGS. 13A and B; and FIG. 15B is a top view of the alternative embodiment bottom.

Figure 16A:
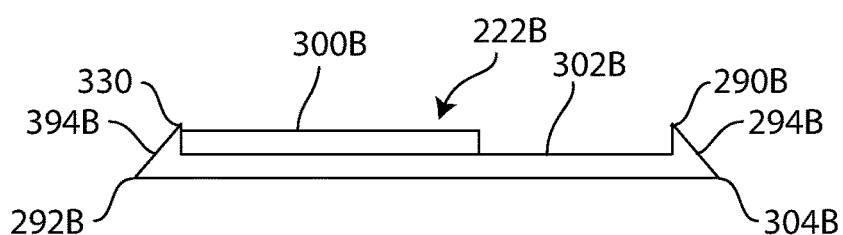
Figure 16B:
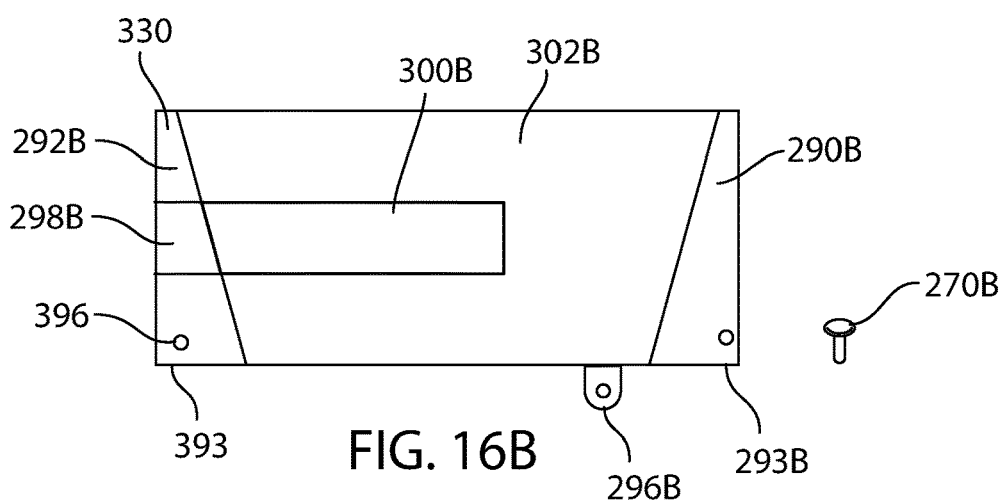

FIG. 16A is a side view of an alternative embodiment bottom of the cassette for use with the base of FIG. 14A; and FIG. 16B is a top view of the alternative embodiment bottom.

Figure 17A:
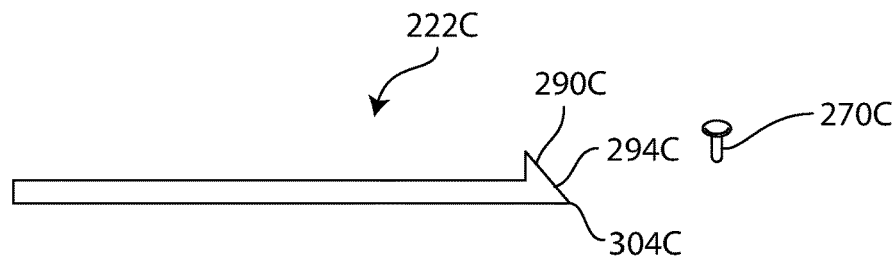
Figure 17B:
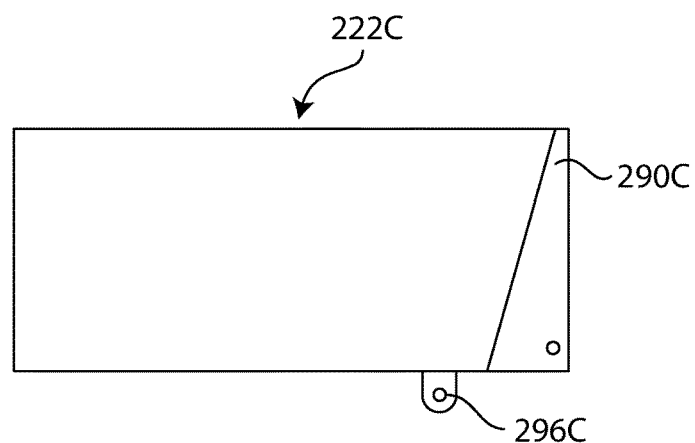
Figure 17C:
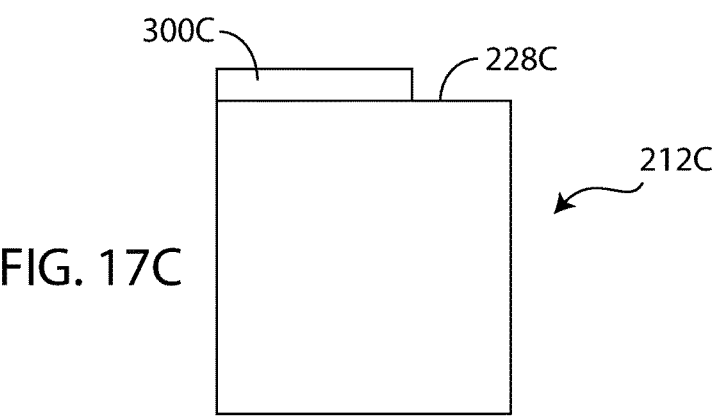
Figure 17D:
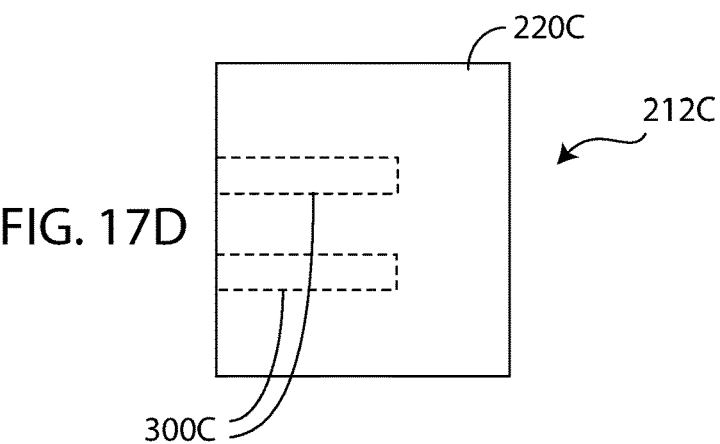

FIG. 17A is a side view of an alternative embodiment bottom of the cassette for use with the base of FIG. 13A and; FIG. 17B is a top view of the alternative embodiment; FIG. 17C is a side view of the cassette for the alternative embodiment bottom; and FIG. 17D is a back view of an alternative embodiment cassette for the alternative embodiment bottom.

Figure 18A:
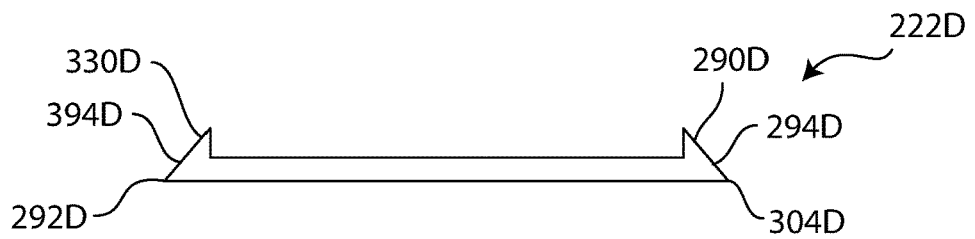
Figure 18B:
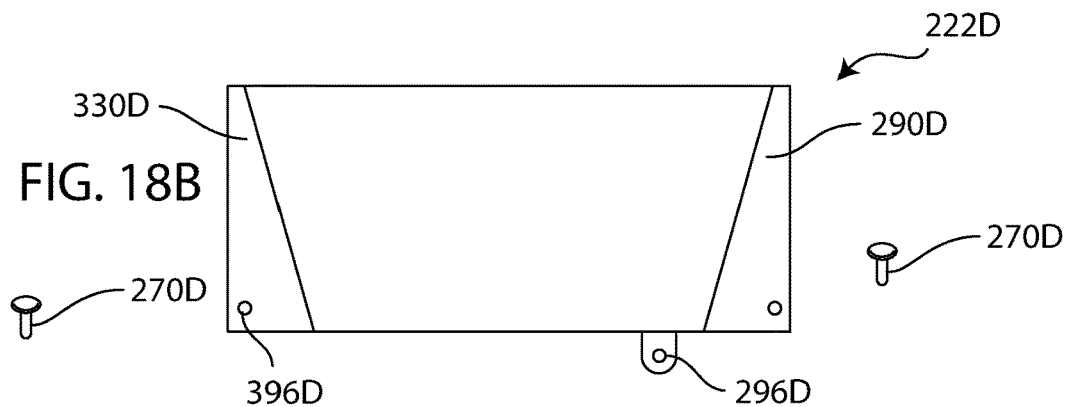
Figure 18C:
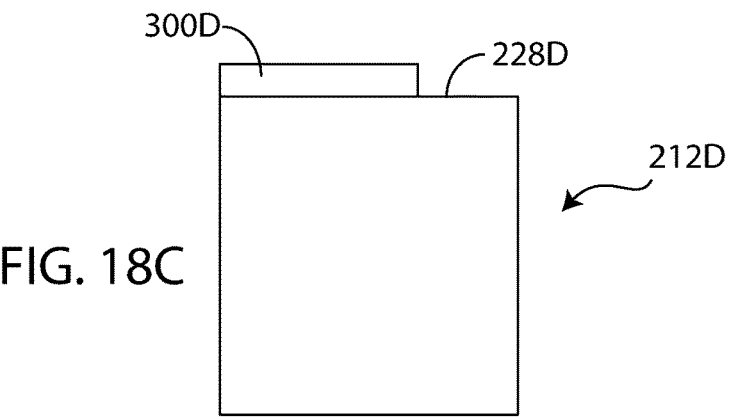
Figure 18D:
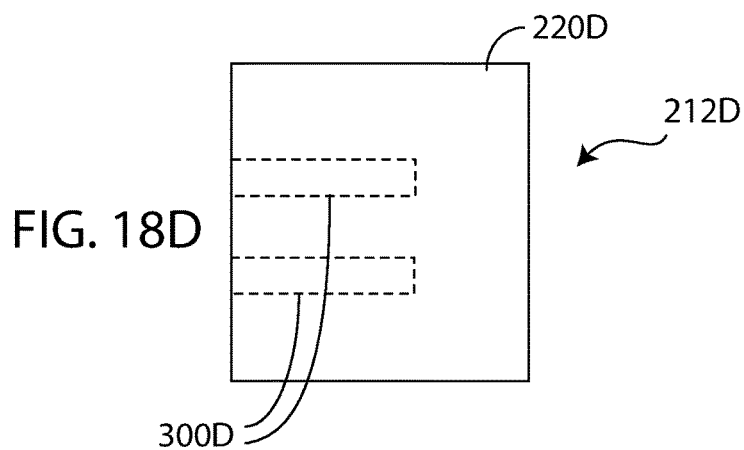

FIG. 18A is a side view of an alternative embodiment bottom of the cassette for use with the base of FIGS. 14A and B; FIG. 18B is a top view of the alternative embodiment; FIG. 18C is a side view of the cassette for the alternative embodiment bottom; and FIG. 18D is a back view of an alternative embodiment cassette for the alternative embodiment bottom.

Figure 19A:
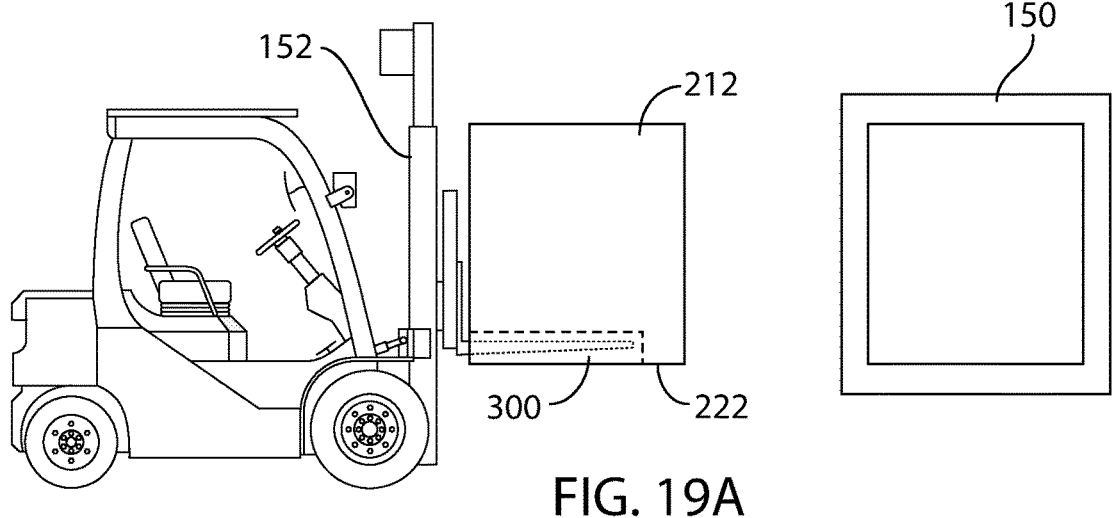

FIG. 19A through 19E show the steps of loading an alternative embodiment cassette onto a tractor. FIG. 19A shows a sectional view of the cassette and FIGS. 19B to 19E show the base and the bottom they are positioned, moved and locked.

Figure 20A:
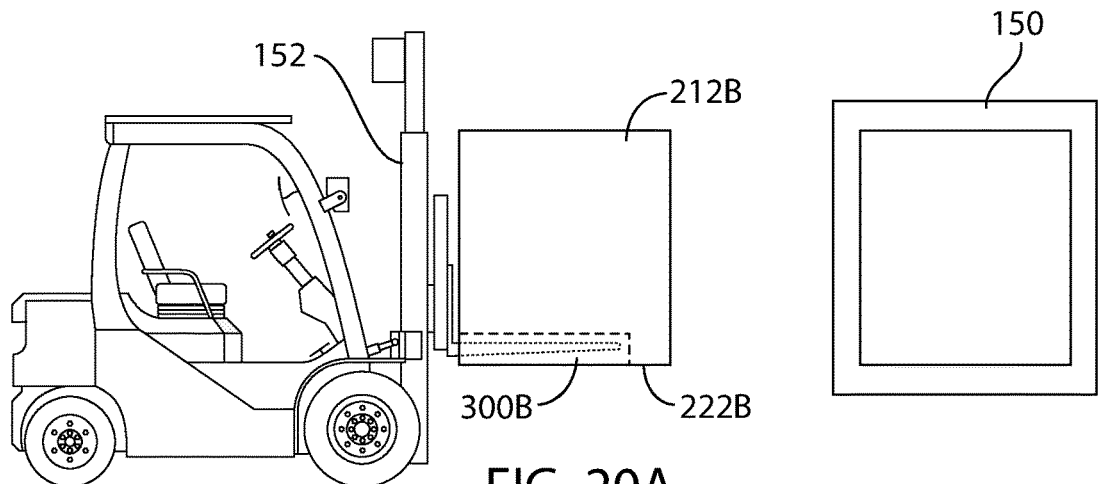

FIGS. 20A through 20E show the steps of loading an alternative embodiment cassette onto a tractor. FIG. 20A shows a sectional view of the cassette and FIGS. 20A to E show the base and the bottom they are positioned, moved and locked.

FIGS. 21A through 21E show the steps of loading an alternative embodiment cassette onto a tractor. FIG. 21A shows a sectional view of the cassette and FIGS. 21A to E show the base and the bottom they are positioned, moved and locked.

Figure 22A:
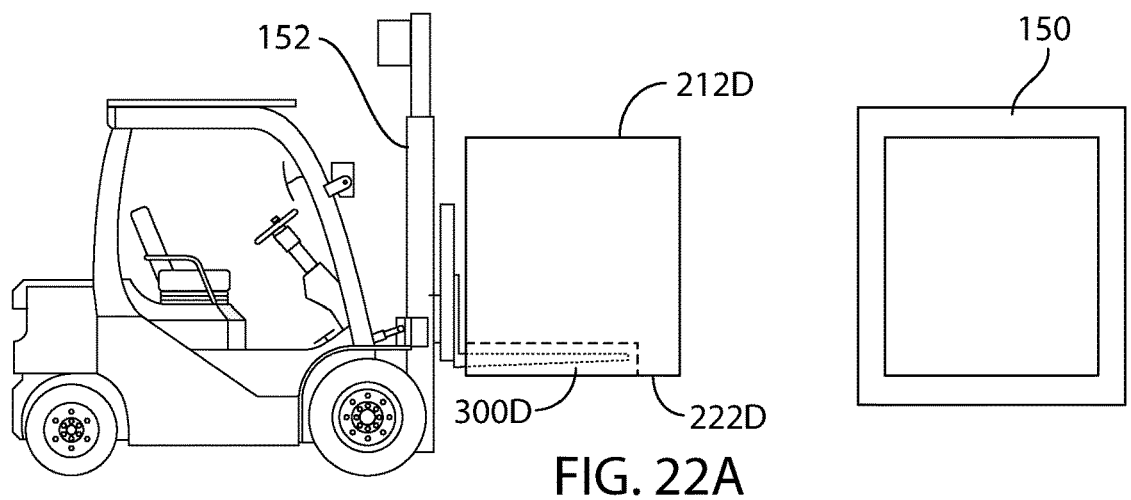

FIGS. 22A through 22E show the steps of loading an alternative embodiment cassette onto a tractor. FIG. 22A shows a sectional view of the cassette and FIGS. 22A to E show the base and the bottom they are positioned, moved and locked.

Figure 23:
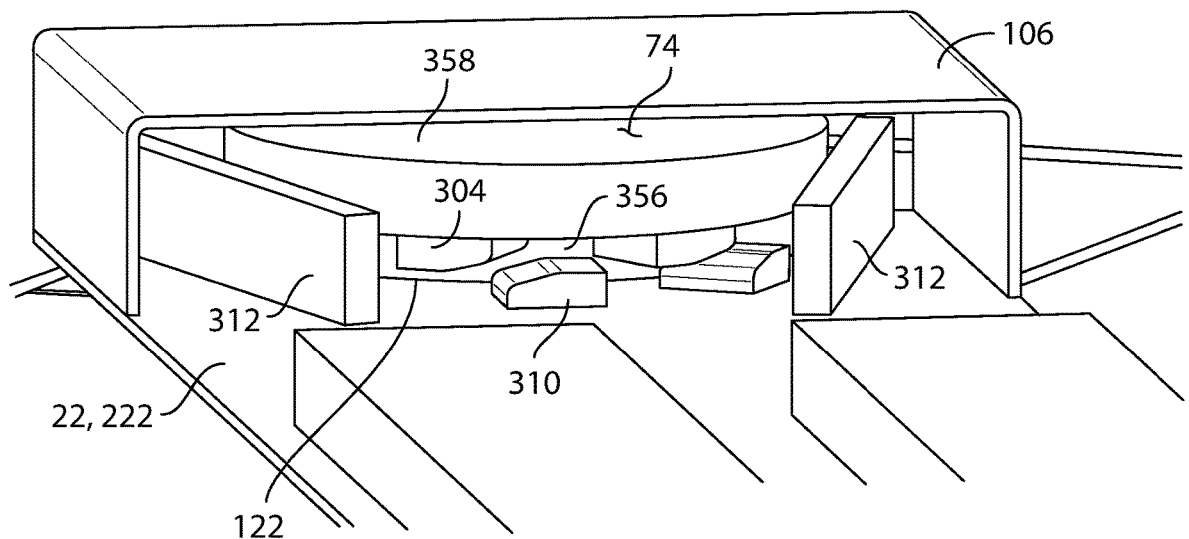

FIG. 23 is a perspective view of the pivot mount.

Figure 24:
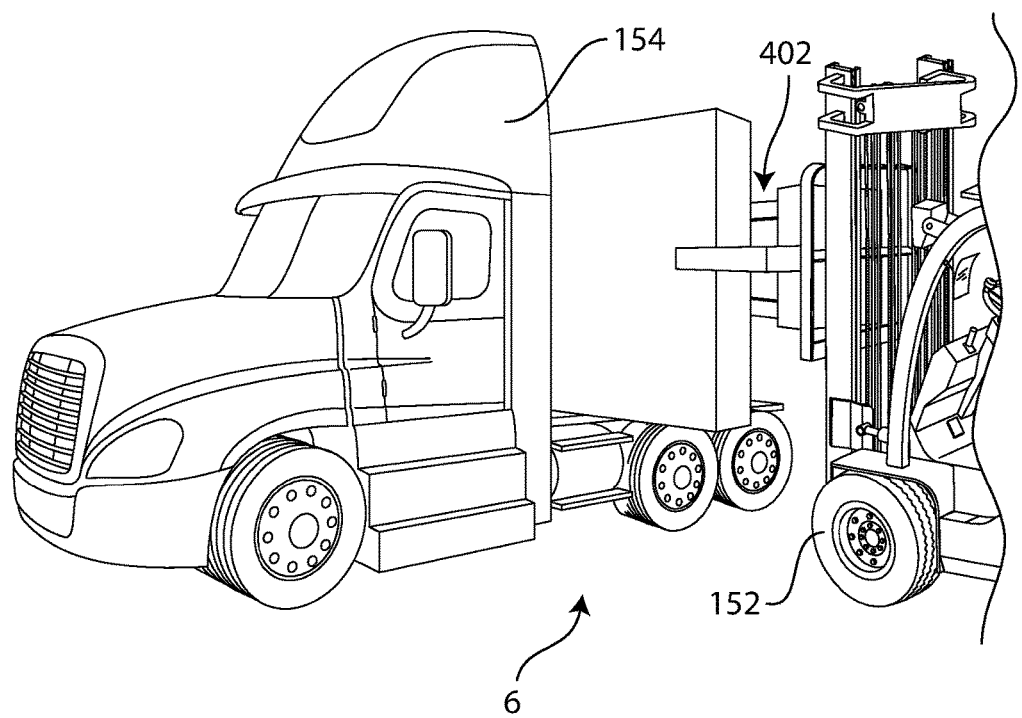

FIG. 24 is a perspective view of the fork attachment on a lifter.

Figure 25A:
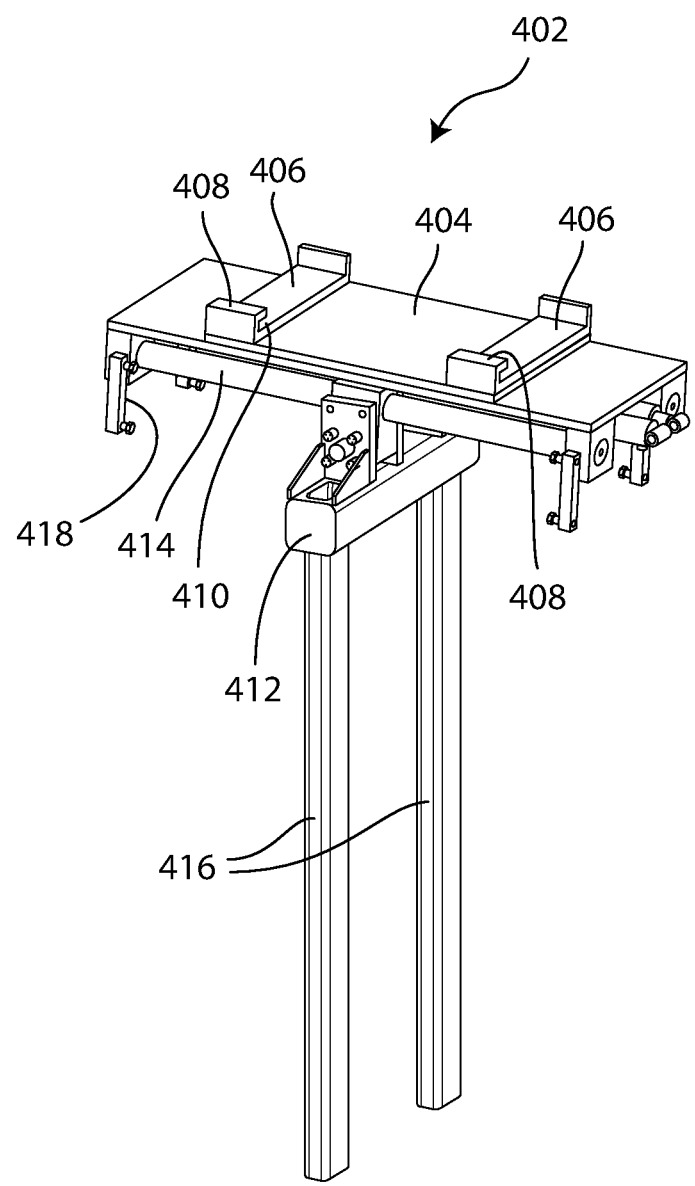
Figure 25B:
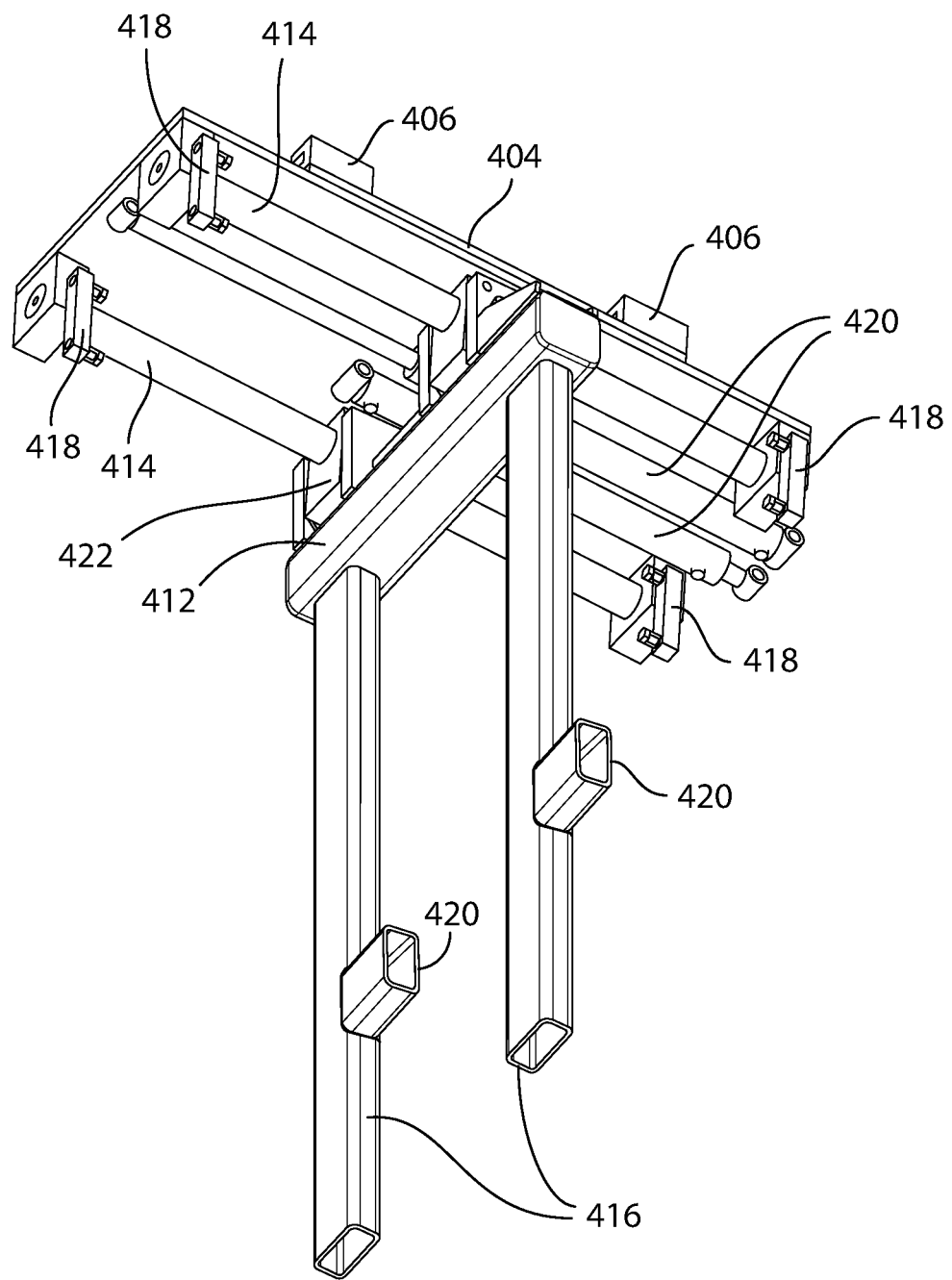

FIG. 25A is a top view of the lift mechanism attachment; and FIG. 25B is a bottom perspective view of the lift mechanism attachment.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Figure 1:
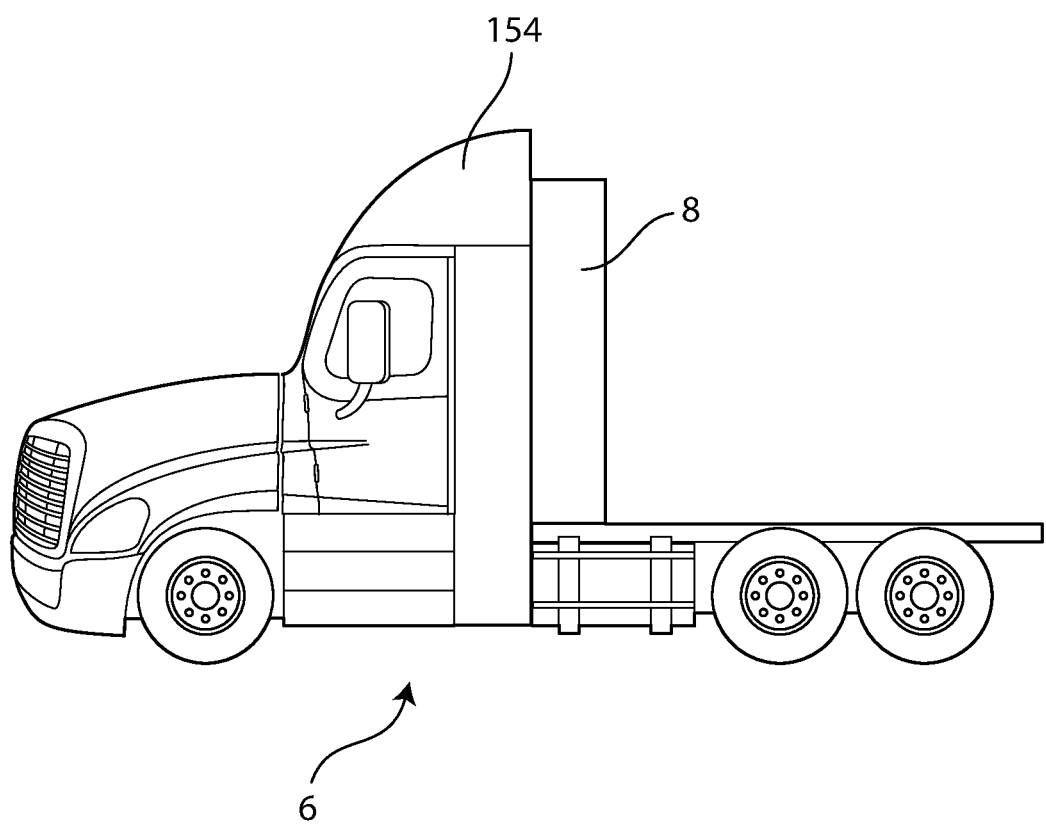
FIG. 1 is a side view of the refueling system of the present technology mounted on a tractor-trailer unit.

A tractor-trailer unit, generally referred to as 6 is shown in FIG. 1 with a refueling system 8 mounted behind the cab 154.

The refueling system, generally referred to as 8 is shown in FIG. 2. In one embodiment, a plurality of fuel cannisters 10 are housed within a cassette, generally referred to as 12, which is pivotally mounted on a base 14. The cassette 12 has a front 16, a back 20, a bottom 22, a first side 24, a second side 26, and a top 28. Cannister apertures 18 extend between the interior of the cassette and the ambient environment. The base 14 includes a locking wedge 30 and gussets 32 for mounting the base onto the tractor. As shown in the shadow view, the cassette 12 has a frame, generally referred to as 34. The front 16, back 20, bottom 22, first side 24, second side 26 and top 28 skin the frame 34. The skin is preferably steel. The cassette 12 can be seen to be pivoted about the base 14.

Figure 3A:
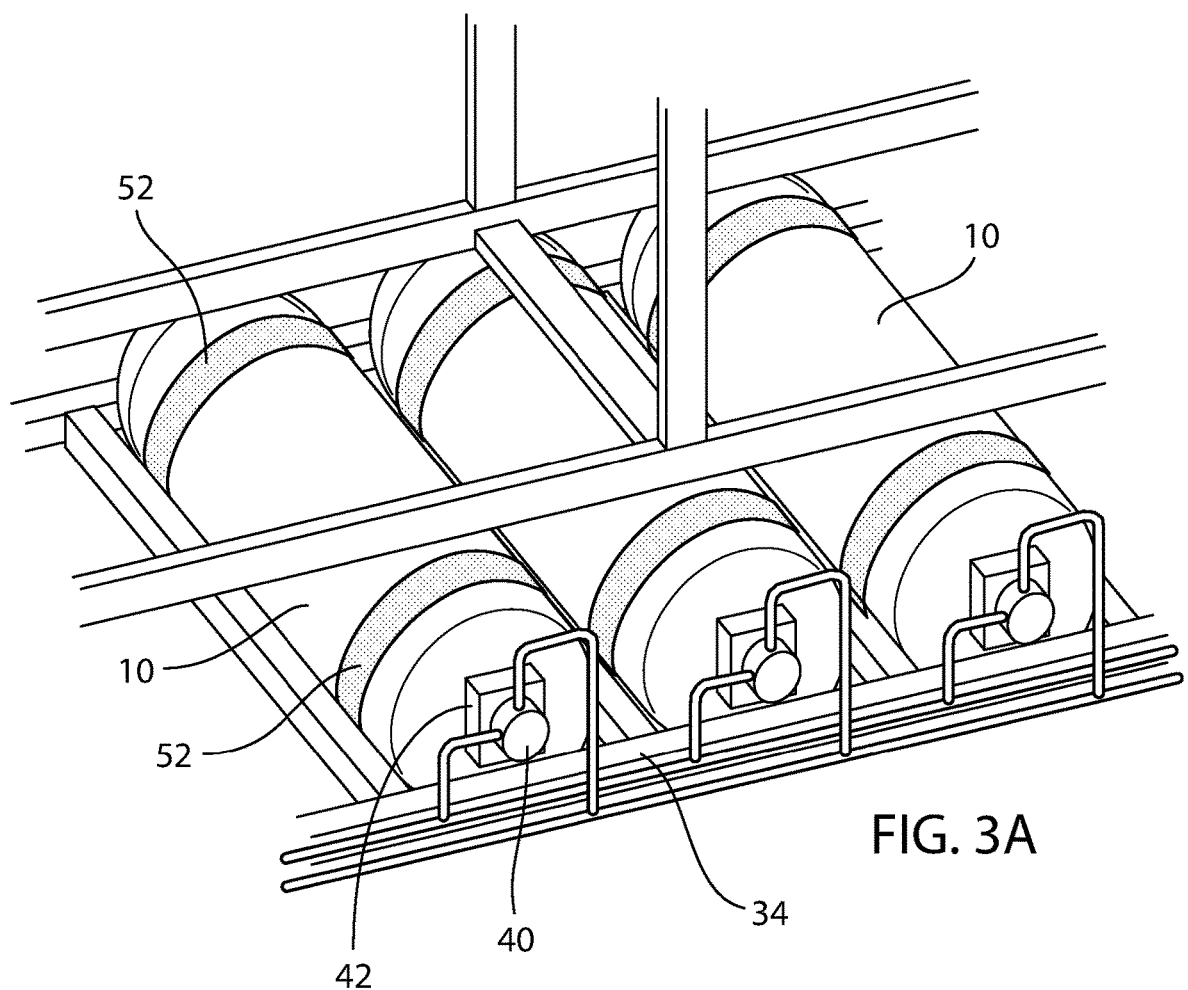
FIG. 3A is a perspective view of the cannister attachment means.

In one embodiment, shown in FIG. 3A, the necks 40 of the fuel cannisters 10 are held in neck mounts 42 on the cassette 12. The neck mounts 42 more specifically, are attached to the frame 34.

Figure 3B:
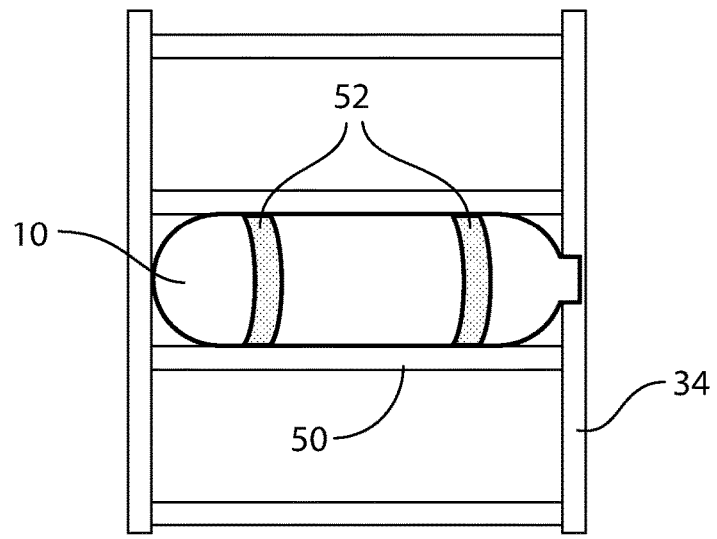
FIG. 3B is an alternative embodiment of FIG. 3A.

In another embodiment shown in FIG. 3B, the frame 34 includes strapping 50 on the back 20. The fuel cannisters 10 are retained on the frame 34 with straps 52 that extend around each fuel cannister 10 and the strapping 50. There are preferably two straps 52 per fuel cannister 10. There may be as few as one cannister 10 per cassette 12.

Figure 4A:
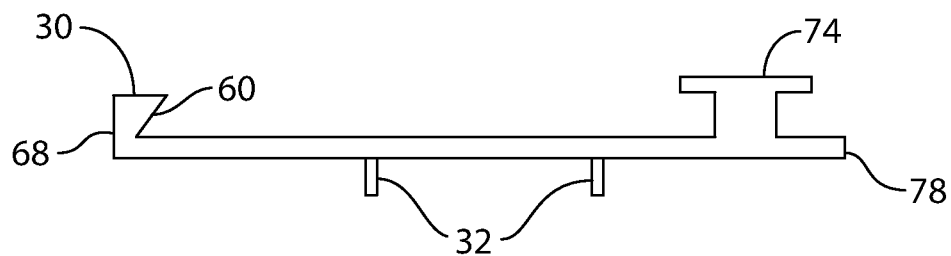
FIG. 4A is a side view of the base of the refueling system of FIG. 2.
Figure 4B:
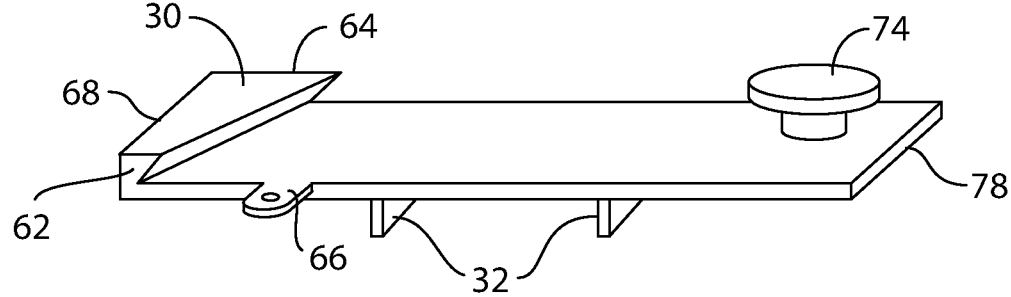
FIG. 4B is a perspective view of the base of the refueling system of FIG. 2.

The details of the base 14 are shown in FIGS. 4A and B. The locking wedge 30 has an obtuse angle 60 extending substantially the length of the locking wedge 30 from the wedge distal end, generally referred to as 62, to the vicinity of the wedge proximal end, generally referred to as 64. The locking wedge 30 is wide at the wedge proximal end 64 and is narrow at the wedge distal end 62. This allows for pivoting of the cassette 12 relative to the base 14. A base aperture 66 is located in the vicinity of the plate distal end 68. A mounting pad 74 is located in the vicinity of the plate proximal end 78. The mounting pad 74 is the pivot point for the cassette 12.

Figure 5A:
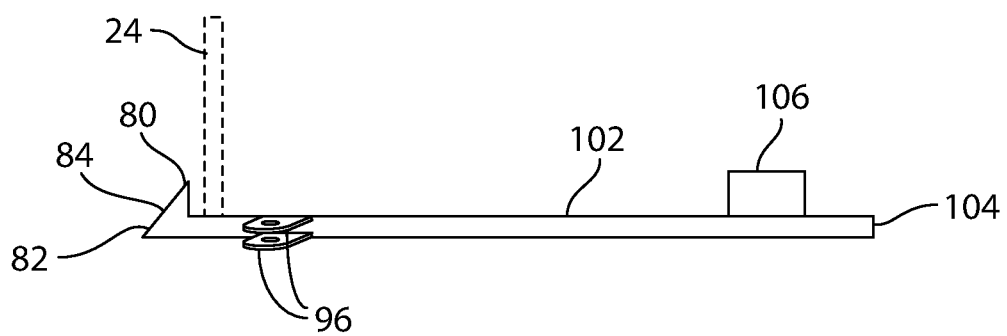
FIG. 5A is a side view of the bottom of the cassette of the refueling system of FIG. 2.
Figure 5B:
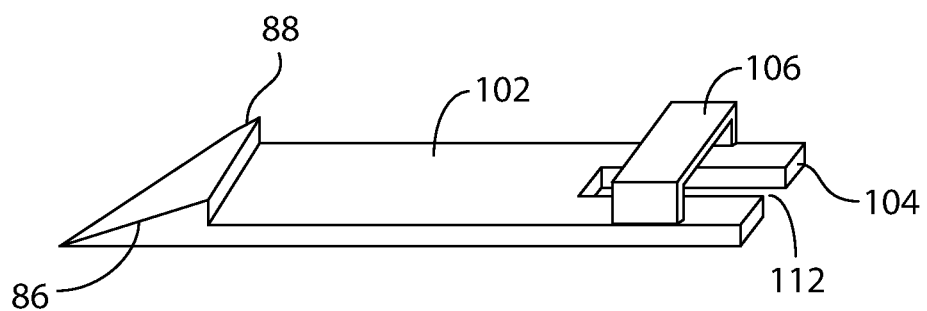
FIG. 5B is a perspective view.
Figure 5C:
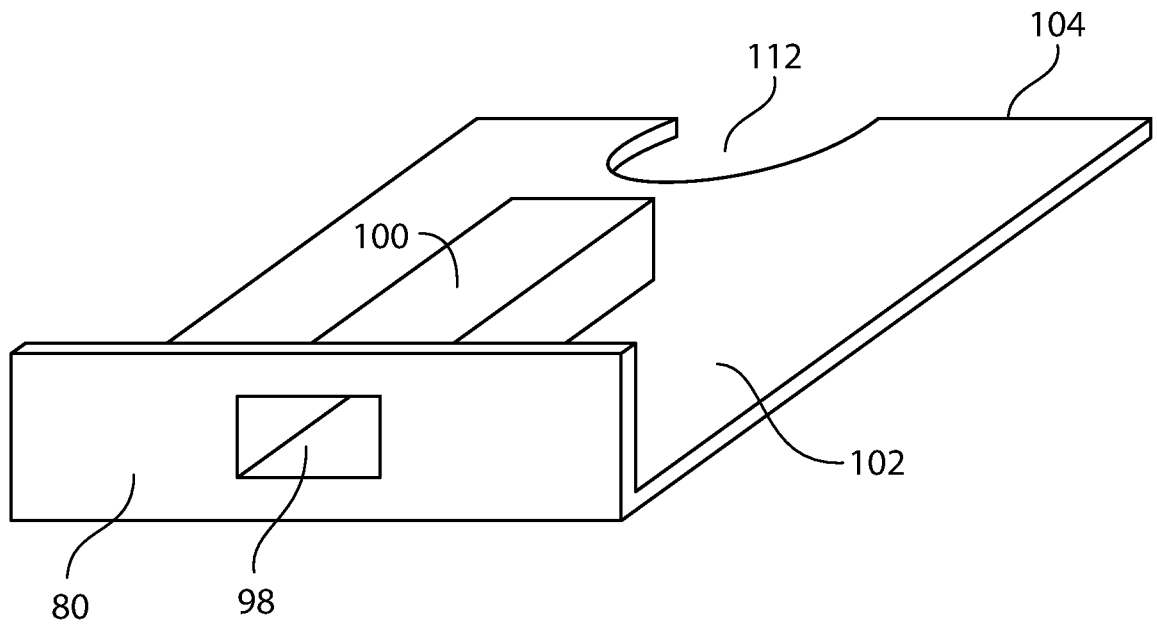
FIG. 5C is a perspective view from the distal end of the bottom of the cassette.

The details of the bottom 22 of the cassette 12 are shown in FIG. 5A. A lip 80 is located at the bottom distal end 82 on the upper surface 102 and extends beyond the first side 24. The lip 80 has an acute angle 84 extending substantially the length of the lip 80 from the lip distal end, generally referred to as 86, to the vicinity of the lip proximal end, generally referred to as 88. The lip 80 is wedge-shaped and is wide at the lip distal end 86 and is narrow at the lip proximal end 88 and is sized to be slidably, releasably engaged in the locking wedge 30. This allows for pivoting of the cassette 12 relative to the base 14. A pair of bottom apertures 96 are positioned to align with the base aperture 66. When the cassette 12 is in the loaded position, a pin 90 extends through the bottom apertures 96 and the base aperture 66 (See FIG. 7D). As shown in FIG. 5C, the lip 80 further includes a lip slot 98 which terminates a fork pocket 100. The fork pocket 100 is affixed to the upper surface 102 of the bottom 22 and extends from the lip slot 98 towards the bottom proximal end 104. Returning to FIGS. 5A and B, a bracket 106 for accepting the mounting pad 74 of the base 14 is located on the upper surface 102 proximate the bottom proximal end 104 and above a wide slot 112.

In another embodiment shown in FIG. 6, the bottom 22 lacks the fork pocket, and the lip 80 lacks the lip slot. Instead, as shown in FIG. 7A, the top 28 is provided with the fork pocket 100. It is attached to the upper surface 120 of the top 28 and extends from the top distal end 122 towards the top proximal end 124.

In another embodiment shown in FIG. 7B and in conjunction with the embodiment of FIG. 6, the top 28 is provided with the fork pocket 100. It is attached to the lower surface 126 of the top 28. As shown in FIG. 7C, a side slot 128 in the first side 24 is located proximate the top 28. The fork pocket 100 is continuous with the side slot 128 and extends from the side slot 128 towards the top proximal end 124.

In another embodiment shown in FIG. 7D and in conjunction with the embodiment of FIG. 6, the back 20 is provided with two fork pockets 100 which extend a substantial distance across the back 20. Each fork pocket 100 has an aperture 108, which are positioned to be engaged with the tabs 420 of the fork attachment (see FIG. 25B). The bar 70 can be seen engaged with the pair of bottom apertures 96 and the base aperture 66. A handle 130 is attached to the bar 70 and moves the bar 70 up and down. The handle is releasably retained in an upper slot 134 and a lower slot 136. The locking mechanism is generally referred to as 132.

As shown in FIG. 8, various configurations of fuel cannisters 10 in the cassette 12 are contemplated. The cannisters may have the same or different characteristics. The cannisters may be of any size, capacity, shape and/or weight and may be made of any suitable material. For example, the cannisters may have a shape that is substantially cylindrical, rectangular, spherical, or the like. In addition, the cannisters may be used to store any gaseous fuel.

The steps of loading and unloading a cassette 12 onto a tractor 6 are shown in FIG. 9A through 9E. As shown in FIG. 9A, the cassette 12 is removed from a storage rack 150 with a lifter 152 with forks that slidably engage with the fork pockets 100 in the back 20 of the cassette 12. As shown in FIG. 9B, the bottom 22 is partially aligned with the base 14, which is mounted on the tractor 6 directly behind the cab 154. It can be seen that the cab 154 has fairings 156. As shown in FIG. 9C, the bottom 22 is positioned on the mounting pad 74 by sliding the bracket 106 over the mounting pad 74. As shown in FIG. 9D, the bottom 22 is then pivoted about the mounting pad 74 with the lifter 152. As shown in FIG. 9E, the cassette is positioned between the fairings 156 of the cab 154. The bottom 22 is then locked to the base 14 with the bar 70, locking wedge 30 and lip 80. In order to remove the cassette 12, the operations are done in reverse.

Figure 10B:
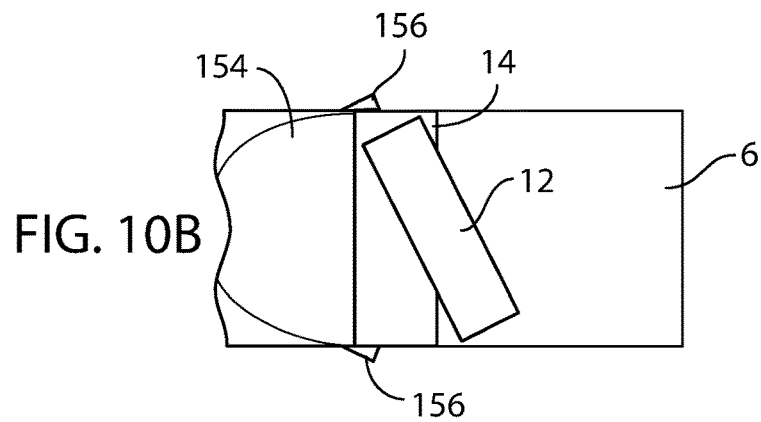
Figure 10C:
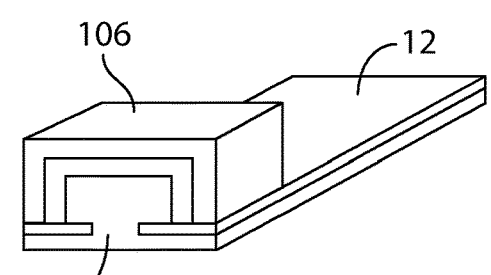
Figure 10D:
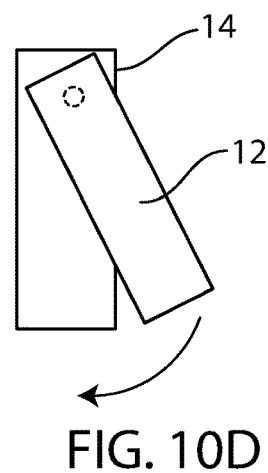
Figure 10E:
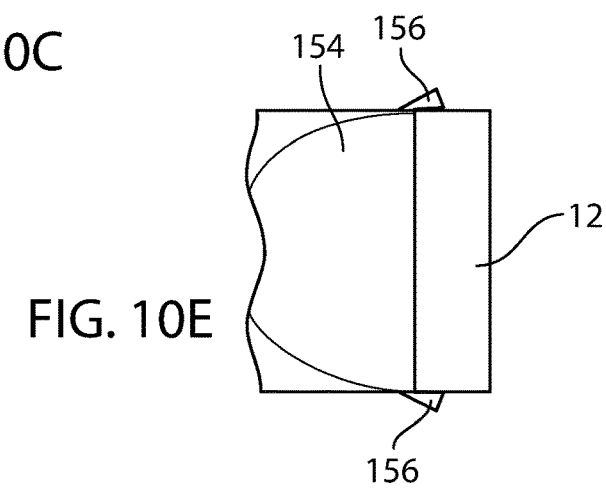

The steps of loading and unloading a cassette 12 onto a tractor 6 are shown in FIG. 10A through 10E. As shown in FIG. 10A, the cassette 12 is removed from a storage rack 150 with a lifter 152 with forks that slidably engage with the fork pocket 100 in the bottom 22 of the cassette 12. As shown in FIG. 10B, the bottom 22 is aligned with the base 14, which is mounted on the tractor 6 directly behind the cab 154. It can be seen that the cab 154 has fairings 156. As shown in FIG. 10C, the bottom 22 is positioned on the mounting pad 74 by sliding the bracket 106 over the mounting pad 74. As shown in FIG. 10D, the bottom 22 is then pivoted about the mounting pad 74 with the lifter 152. As shown in FIG. 10E, the cassette is positioned between the fairings 156 of the cab 154. The bottom 22 is then locked to the base 14 with the pin 90, locking wedge 30 and lip 80. In order to remove the cassette 12, the operations are done in reverse.

Figure 11B:
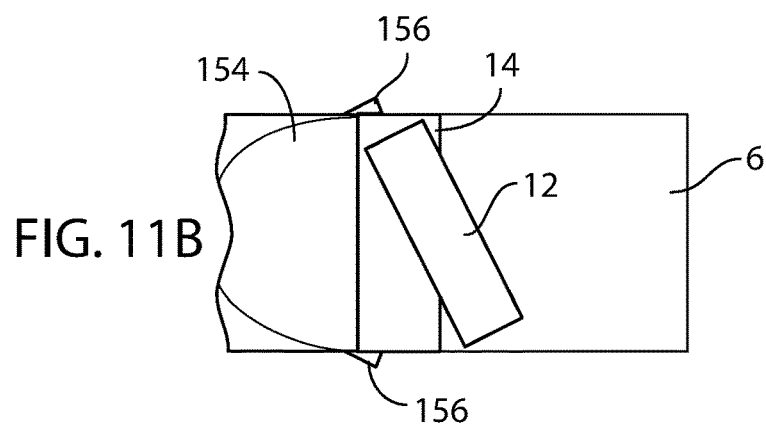
Figure 11C:
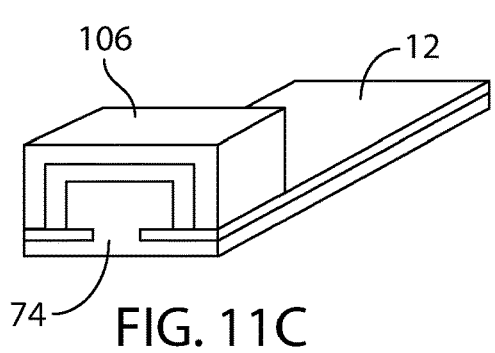
Figure 11D:
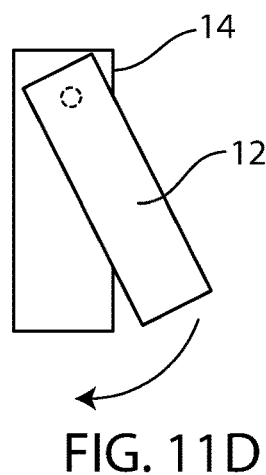
Figure 11E:
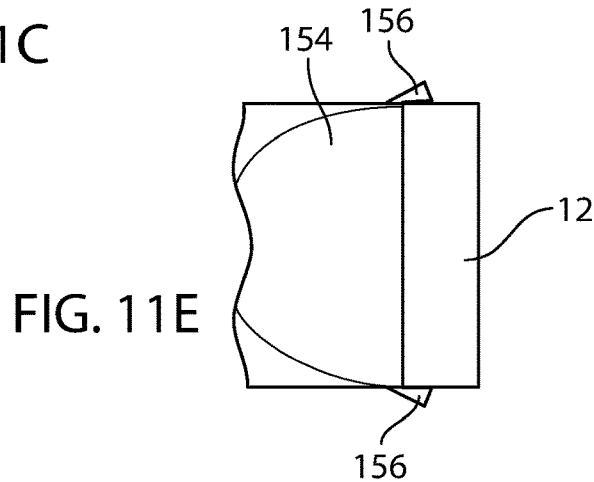

The steps of loading and unloading a cassette 12 onto a tractor 6 is shown in FIG. 11A through 11E. As shown in FIG. 11A, the cassette 12 is removed from a storage rack 150 with a lifter 152 with forks that slidably engage with the fork pocket 100 in the top 28 (either on the upper surface or the lower surface of the top) of the cassette 12. As shown in FIG. 11B, the bottom 22 is aligned with the base 14, which is mounted on the tractor 6 directly behind the cab 154. It can be seen that the cab 154 has fairings 156. As shown in FIG. 11C, the bottom 22 is positioned on the mounting pad 74 by sliding the bracket 106 over the mounting pad 74. As shown in FIG. 11D, the bottom 22 is then pivoted about the mounting pad 74 with the lifter 152. As shown in FIG. 11E, the cassette is positioned between the fairings 156 of the cab 154. The bottom 22 is then locked to the base 14 with the pin 90, locking wedge 30 and lip 80. In order to remove the cassette 12, the operations are done in reverse.

An alternative embodiment cassette 12, shown in FIG. 12, is designed for cabs that lack fairings. The lack of fairings allows for the cassette to be delivered parallel to the back of the cab hence the mounting pad of the base and the bracket of the bottom of the cassette are not required. Instead, a second lip 174 is at the proximal end and extends beyond the second side 26.

The alternative embodiment base, generally referred to as 214, is shown in FIGS. 13A and 13B. A locking wedge 230 has an obtuse angle 260 extending substantially the length of the locking wedge 230 from the locking wedge distal end, generally referred to as 262, to the vicinity of the locking wedge proximal end, generally referred to as 264. The locking wedge 230 is wide at the wedge proximal end 264 and is narrow at the wedge distal end 262. This allows for pivoting of the cassette 12 relative to the base 214. A base aperture 266 is located in the vicinity of the plate proximal end 278. A bracket-shaped locking member 284 is pivotally mounted on the distal end 278 to clamp the cassette 12 to the base 214. This allows for loading of the cassette 12 from one side to the other side of the tractor and normal to the length of the tractor.

As shown in FIGS. 14A and B, in an alternative embodiment, the bracket-shaped locking member is replaced with a second locking wedge 230B in the vicinity of the distal end 276 of the base 214B. The second locking wedge 230B has an obtuse angle 260B extending substantially the length of the locking wedge 230 from the locking wedge distal end, generally referred to as 262B, to the vicinity of the locking wedge proximal end, generally referred to as 264B. The second locking wedge 230B is wide at the wedge proximal end 264B and is narrow at the wedge distal end 262B. This allows for pivoting of the cassette 212 relative to the base 214. A base aperture 266B is located in the vicinity of the plate distal end 268B. This design permits loading only along the length of the tractor. The cab can have a fairing and the cassette therefore may or may not have a fairing.

An alternative embodiment bottom, generally referred to as 222 is shown in FIG. 15A and FIG. 15B. It is for use with the base of FIGS. 13A and 13B. A lip 290 is located at the bottom proximal end 304. It has a wedge-shaped leading edge 294 and is sized to be slidably, releasably engaged in the locking wedge 230. A pair of bottom apertures 296 are positioned to align with the base aperture 266. When the cassette 212 is in the loaded position, the pin 270 extends through the back apertures 296. A fork pocket 300 is affixed to the upper surface 302 of the bottom 222 and extends from the vicinity of the bottom distal end 292 towards the bottom proximal end 304, leaving a space 306 at the bottom distal end 292 for the bracket-shaped locking member 284 to clamp the cassette 212 to the base 214.

Another alternative embodiment bottom, generally referred to as 222B is shown in FIG. 16A and FIG. 16B. It is for use with the base of FIGS. 14A and B. A lip 290B is located at the bottom proximal end 304B. It has a wedge-shaped leading edge 294B and is sized to be slidably, releasably engaged in the locking wedge 230B. A pair of bottom apertures 296B are positioned to align with the base aperture 266B. When the cassette 212B is in the loaded position, the pin 270B extends through the bottom apertures 296B.

A second lip 330 is located at the bottom distal end 292B. It has a wedge-shaped leading edge 394 and is sized to be slidably, releasably engaged in the locking wedge 230B.

In yet another alternative bottom, generally referred to as 222C is shown in FIG. 17A and FIG. 17B. It is for use with the base of FIGS. 13A and 13B. A lip 290C is located at the bottom proximal end 304C. It has a wedge-shaped leading edge 294C and is sized to be slidably, releasably engaged in the locking wedge 230. Bottom apertures 296C are positioned to align with the base aperture 266. When the cassette 212C is in the loaded position, the pin 270C extends through the bottom apertures 296C. The fork pocket 300C is located either in the top 228C (FIG. 17C) or the back 220C (FIG. 17D) of the cassette 212C.

Another alternative embodiment bottom, generally referred to as 222D is shown in FIG. 18A-D. It is for use with the base of 13A and B, but lacking the bracket. A lip 330D is located at the bottom proximal end 304D. It has a wedge-shaped leading edge 294D and engages the base 214B. Bottom apertures 296D are positioned to align with the base aperture 266D. When the cassette 212D is in the loaded position, the pin 270D extends through the bottom apertures 296D and the base aperture 266D. The fork pocket 300D is located either in the top 228D (FIG. 18C) or the back 220D (FIG. 18D) of the cassette 212C.

A second lip 290D is located at the bottom distal end 292D. It has a wedge-shaped leading edge 394D and is sized to be slidably, releasably engaged in the second locking wedge 230B. A pair of second back apertures 396D are positioned to align with the second track aperture 266B and the second base aperture 268B. When the cassette 212D is in the loaded position, the pin 270D extends through the second back apertures 396D and the second base aperture 268B.

In another embodiment, the locking wedge is replaced with a locking track with a slot. The bottom has a lip that engages the slot.

Figure 19B:
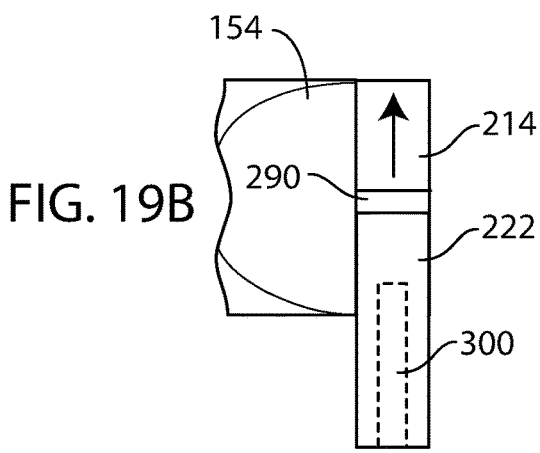
Figure 19C:
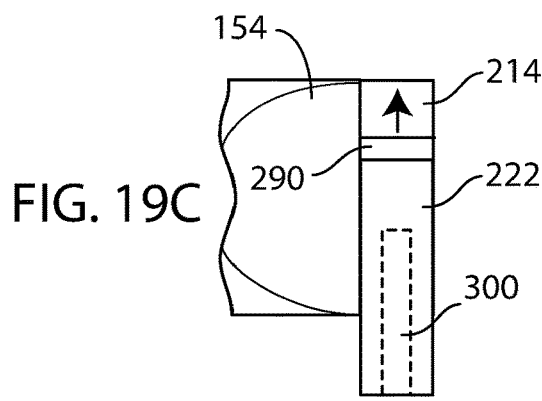
Figure 19D:
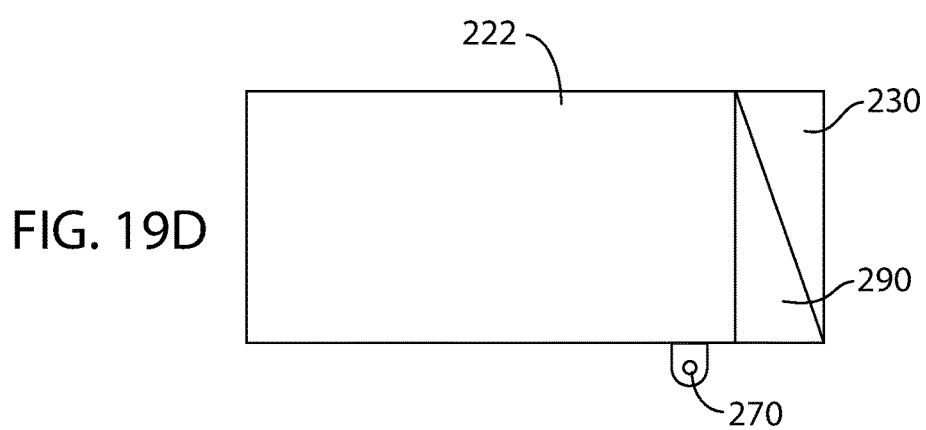
Figure 19E:
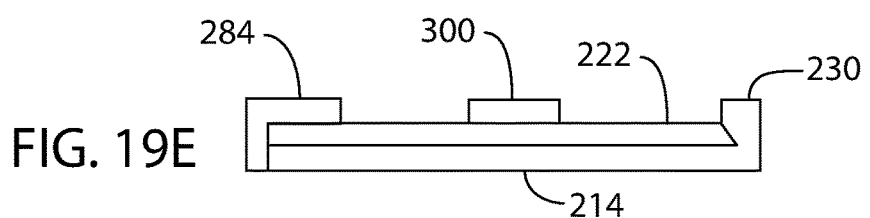

The steps of loading and unloading the cassette 212 including the base of FIGS. 13A and 13B and the bottom of FIGS. 15A and B onto a tractor 6 is shown in FIG. 19A through 19E. As shown in FIG. 19A, the cassette 212 is removed from a storage rack 150 with a lifter 152 with forks that slidably engage with the fork pocket 300 in the bottom 222. As shown in FIG. 19B, the bottom 222 is aligned with the base 214, which is mounted on the tractor 6 directly behind the cab 154. As shown in FIG. 19C, the bottom 222 is slid along the length of the base 214. As shown in FIG. 19D, the bottom 222 is then is then locked to the base 214 with the pin 270, locking wedge 230 and lip 290. As shown in FIG. 19E, the bottom 222 is then locked to the base 14 with the bracket-shaped locking member 284. In order to remove the cassette 12, the operations are done in reverse.

Figure 20B:
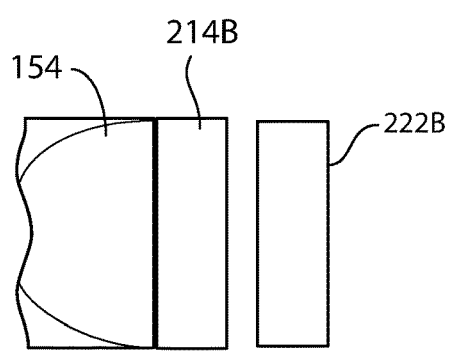
Figure 20C:
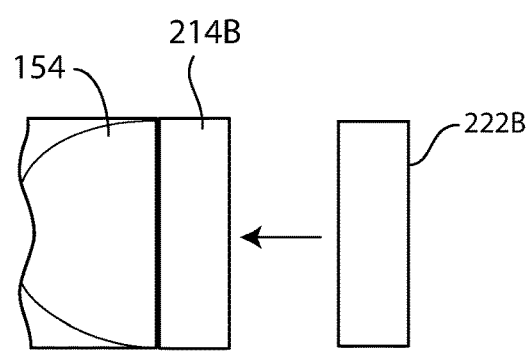
Figure 20D:
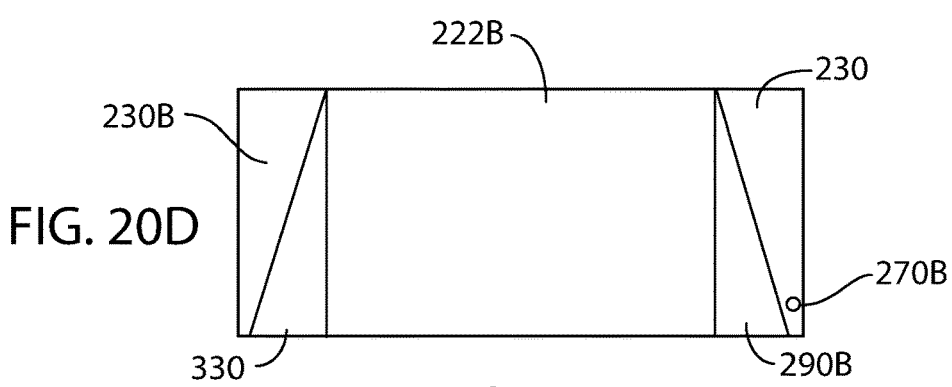
Figure 20E:
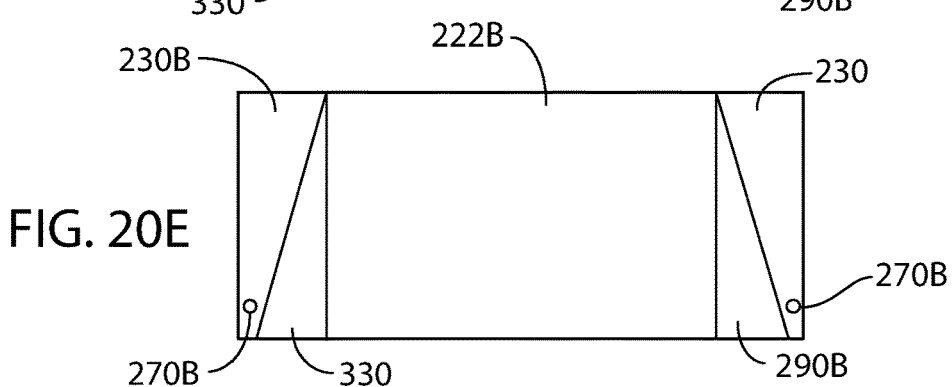

The steps of loading and unloading a cassette 212B including the base of FIGS. 14A and B and the bottom of FIGS. 16A and B onto a tractor 6 is shown in FIG. 20A through 20E. As shown in FIG. 20A, the cassette 212B is removed from a storage rack 150 with a lifter 152 with forks that slidably engage with the fork pocket 300B in the bottom 222B. As shown in FIG. 20B, the bottom 222B is beside the base 214, which is mounted on the tractor 6 directly behind the cab 154. As shown in FIG. 20C, the bottom 222B is slid across the base 214 towards the cab. As shown in FIG. 20D, the bottom 222B is then is then locked to the base 214 with the pin 270B, locking wedge 230 and lip 290B. As shown in FIG. 20E, the bottom 222B is then locked to the base 214 with the second locking wedge 230B. In order to remove the cassette 12, the operations are done in reverse.

The steps of loading and unloading the cassette 212C including the base of FIGS. 13A and 13B and the bottom of FIG. 17A—D onto a tractor 6 is shown in FIG. 21A through 21E. As shown in FIG. 21A, the cassette 212C is removed from a storage rack 150 with a lifter 152 with forks that slidably engage with the fork pocket 300 in the back 220C or top 228C. As shown in FIG. 21B, the bottom 222C is aligned with the base 214, which is mounted on the tractor 6 directly behind the cab 154. As shown in FIG. 21C, the bottom 222C is slid along the length of the base 214. As shown in FIG. 21D, the bottom 222C is then is then locked to the base 214 with the pin 270C, locking wedge 230C and lip 290C. As shown in FIG. 21E, the cassette 12 is then locked to the base 214 with the bracket-shaped locking member 284. In order to remove the cassette 12, the operations are done in reverse.

Figure 22B:
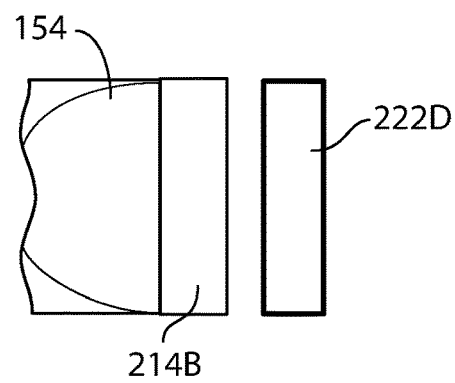
Figure 22C:
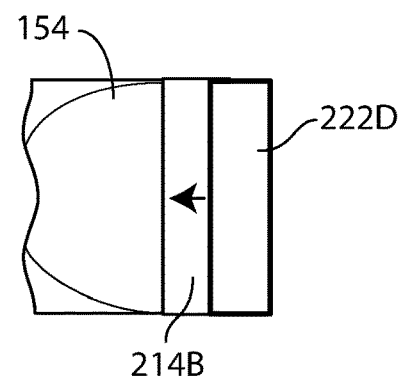
Figure 22D:
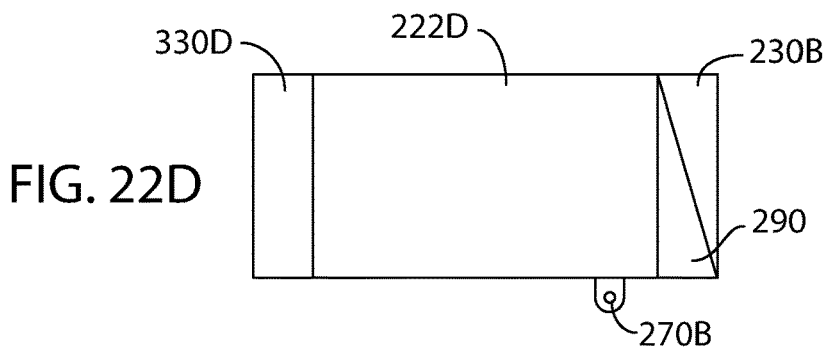
Figure 22E:
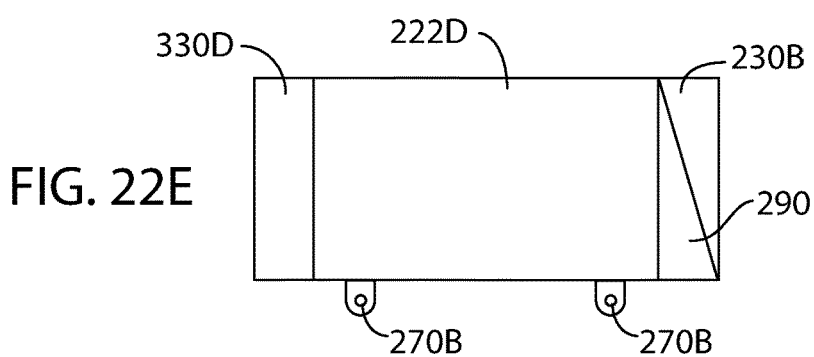

The steps of loading and unloading a cassette 212D including the base of FIGS. 14A and B and the bottom of FIG. 18 onto a tractor 6 is shown in FIG. 22A through 22E. As shown in FIG. 22A, the cassette 212D is removed from a storage rack 150 with a lifter 152 with forks that slidably engage with the fork pocket 300D in the bottom 222D of the cassette 212D. As shown in FIG. 22B, the bottom 222D is beside with the base 214, which is mounted on the tractor 6 directly behind the cab 154. As shown in FIG. 22C, the bottom 222D is slid across the base 214 towards the cab. As shown in FIG. 22D, the bottom 222D is then is then locked to the base 214 with the pin 270D and locking wedge 230B and lip 280B. As shown in FIG. 22E, the bottom 222D is then locked to the base 214 with the second locking wedge 230BB. In order to remove the cassette 12, the operations are done in reverse.

As would be known to one skilled in the art, the cassette of any embodiment can be loaded vertically onto the base.

As shown in FIG. 23, the mounting pad 74 has a post 356 and a circular top 358. The post 356 is engaged in the slot 122 of the bottom 22, 222. The underside of the top 358 has a locking mechanism, which in one embodiment are two sloping wedges 304. The bottom 22, 222 has sloping wedges 310 that engage with sloping wedges 304 of the mounting pad 74. Guides 312 assist in locating the bottom 22, 222 on the mounting pad 74. In this manner, the mounting pad and the bracket are in pivotal engagement with one another, until reaching a stop, where they are releasably engage.

In an alternative embodiment, the mounting pad is pivotally mounted on the base. In this embodiment, the bottom locks onto the mounting pad and then the two pivot together.

As shown in FIG. 24, a lift mechanism attachment, generally referred to as 402 is used to assist the lift mechanism operator to load and unload the cassette 12, 212, 212A, 212B, 212C, 212D. The details of the lift mechanism attachment 402 are shown in FIGS. 25A and 25B. As shown in FIG. 25A, the lift mechanism attachment 402 has a base 404 with two brackets 406 spaced apart on the base 404. Each bracket 406 has a lip 408 on one side that defines a groove 410. The brackets 40 are for engaging the cassette along the first side. A beam 412 is slidably engaged to two rails 414. Two forks 416 are attached to the beam 412. Stop blocks 418 extends from the base 404 parallel to the forks 416 to stop the base 404 at the ends of the rails 414. The length of these stop blocks 418 is adjustable with bolts. Tabs 420 are located on the top of each fork 416. The tabs 420 engage the fork pockets as each fork pocket 100 has an aperture 108 (see FIG. 7D) for accepting the tabs 420. This ensures that the cassette is firmly held by the lift mechanism attachment 402. The forks 416 also each have an aperture for accepting the bar 70, such that when the locking mechanism 132 is disengaged, in other words, when the handle is in the upper slot 134 and the bar 70 is released from the bottom apertures 96, the cassette is still held in place. Pivot mounts 422 allow the forks 416 to pivot as they are shifted along the rails 414, thus keeping the cassette properly aligned. The lift mechanism attachment 402 functions to:
1) Locks the fork in place when transporting the cassette.
2) Locks the cassette to the truck.
3) Prevents the disconnection of gas between the cassette and truck when the cassette is locked into the truck.
4) Prevents the connection of gas when the cassette is not locked onto the truck.

As shown in FIG. 25B, one or more actuators 420, which are preferably a hydraulic ram, are attached the beam 412 and moves the base 404 relative to the forks 416.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A system for retaining a plurality of compressed gas cannisters for fueling a vehicle, the system comprising:
a base which includes: a plate including a distal end and a proximal end; a locking wedge at the distal end of the plate, the locking wedge defining an obtuse angle; and a mounting pad proximate to the proximal end;
a cassette which includes: a top; a first side; a second side; a front; a back; and a bottom to define an interior, the interior for housing a plurality of compressed gas cannisters; at least one fork pocket mounted on a position selected from the group consisting of: the top, the bottom and the back; a plurality of gas cannister apertures extending between the interior and an ambient environment, wherein the bottom comprises a lip which extends outward beyond the front, and a bracket, which is on an upper surface of the bottom proximate to the back, and releasably engages with the mounting pad to form a pivot mount.

2. The system of claim 1, comprising two fork pockets on the back.

3. The system of claim 2, wherein the base includes a base aperture, and the bottom includes at least one bottom aperture.

4. The system of claim 3, further comprising a locking mechanism, which is a pin coupled to a handle, the pin engaged with the bottom aperture and for engagement with the base aperture.

5. The system of claim 4, further comprising the plurality of compressed gas cylinders.

6. The system of claim 5, wherein the compressed gas cylinders contain hydrogen gas.

* * * * *